(12) United States Patent
Furuichi

(10) Patent No.: US 10,952,041 B2
(45) Date of Patent: Mar. 16, 2021

(54) CONTROL DEVICE AND METHOD FOR PROCESSING A SERVICE USING A PLURALITY OF SENSOR DEVICES IN A DISTRIBUTED MANNER WHILE SUPPRESSING A COMMUNICATION LOAD

(71) Applicant: SONY CORPORATION, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/477,740

(22) PCT Filed: Nov. 30, 2017

(86) PCT No.: PCT/JP2017/042941
§ 371 (c)(1),
(2) Date: Jul. 12, 2019

(87) PCT Pub. No.: WO2018/154901
PCT Pub. Date: Aug. 30, 2018

(65) Prior Publication Data
US 2019/0364399 A1  Nov. 28, 2019

(30) Foreign Application Priority Data
Feb. 21, 2017 (JP) .............................. JP2017-030039

(51) Int. Cl.
*H04W 4/38* (2018.01)
*H04Q 9/00* (2006.01)
*H04W 8/18* (2009.01)

(52) U.S. Cl.
CPC ................ *H04W 4/38* (2018.02); *H04Q 9/00* (2013.01); *H04W 8/18* (2013.01)

(58) Field of Classification Search
CPC ......... H04W 36/16; H04W 4/21; H04W 4/38; H04W 4/70; H04W 8/18; H04W 92/24
See application file for complete search history.

(56) References Cited

U.S. PATENT DOCUMENTS

2009/0128298 A1* 5/2009 Ryu ...................... G08C 21/00
340/10.1
2014/0365517 A1* 12/2014 Calo ..................... G06F 16/243
707/760
(Continued)

FOREIGN PATENT DOCUMENTS

JP    2005-165952 A    6/2005
JP    2008-085832 A    4/2008
(Continued)

OTHER PUBLICATIONS

Frantti et al., Requirements of Secure WSN-MCN Edge Router, The International Conference on Information Networking 2013, Jan. 28-30, 2013, pp. 210-215, IEEE, Bangkok, Thailand.

*Primary Examiner* — Mewale A Ambaye
(74) *Attorney, Agent, or Firm* — Paratus Law Group, PLLC

(57) ABSTRACT

There is provided a mechanism capable of processing a service using a plurality of sensor devices in a distributed manner while suppressing a communication load and providing the service. A control device is arranged on a local network side with respect to a gateway between an internet and a local network. The control device includes: a control unit configured to transmit or receive information regarding one or more sensor devices wirelessly connected to a first cell associated with the control device to or from another control device associated with a second cell.

16 Claims, 26 Drawing Sheets

(56) References Cited

U.S. PATENT DOCUMENTS

| | | | | |
|---|---|---|---|---|
| 2016/0366008 A1* | 12/2016 | Zeng | ................. | H04L 43/06 |
| 2017/0086011 A1* | 3/2017 | Neves | ................. | H04B 1/3822 |
| 2018/0284735 A1* | 10/2018 | Cella | ................. | G05B 23/0264 |
| 2018/0297732 A1* | 10/2018 | Hattori | ................. | B65B 9/073 |
| 2020/0348662 A1* | 11/2020 | Cella | ................. | G05B 23/0286 |

FOREIGN PATENT DOCUMENTS

| | | |
|---|---|---|
| JP | 2014-522164 A | 8/2014 |
| JP | 2016-528583 A | 9/2016 |

\* cited by examiner

CONTROL DEVICE AND METHOD FOR PROCESSING A SERVICE USING A PLURALITY OF SENSOR DEVICES IN A DISTRIBUTED MANNER WHILE SUPPRESSING A COMMUNICATION LOAD

CROSS REFERENCE TO PRIOR APPLICATION

This application is a National Stage Patent Application of PCT International Patent Application No. PCT/JP2017/042941 (filed on Nov. 30, 2017) under 35 U.S.C. § 371, which claims priority to Japanese Patent Application No. 2017-030039 (filed on Feb. 21, 2017), which are all hereby incorporated by reference in their entirety.

TECHNICAL FIELD

The present disclosure relates to a control device and a method.

BACKGROUND ART

In recent years, development related to internet of things (IoT) has been actively performed. In IoT, wireless communication is an important technology theme because various things are connected to a network to exchange information. Therefore, in the 3rd generation partnership project (3GPP), standardization of IoT communication such as machine type communication (MIC) and narrow band IoT (NB-IoT) for realizing small packets, low power consumption, or low cost has been performed.

As a form of an IoT service realized by such a technology, a form of acquiring sensing information from many different types of sensor devices, processing the acquired sensing information into some form, and providing the processed information to a consumer is assumed. For example, Patent Document 1 below discloses a monitoring camera system that integrates sensing information obtained by a plurality of sensor devices into one server on a network and processes, for example, the sensing information.

CITATION LIST

Patent Document

Patent Document 1: Japanese Patent Application Laid-Open No. 2008-85832

SUMMARY OF THE INVENTION

Problems to be Solved by the Invention

However, the technology described in Patent Document 1 performs cooperative operation of a plurality of monitoring cameras on the basis of control by one server. Therefore, a load and a communication load on the server may become excessive as a sensable range is expanded and the number of monitoring cameras increases, and the accuracy of the monitoring cameras is improved and the amount of data to be transmitted increases.

Thus, the present disclosure proposes a mechanism capable of processing a service using a plurality of sensor devices in a distributed manner while suppressing a communication load and providing the service.

Solutions to Problems

According to the present disclosure, provided is a control device arranged on a local network side with respect to a gateway between an internet and a local network, the control device including a control unit configured to transmit or receive information regarding one or more sensor devices wirelessly connected to a first cell associated with the control device to or from another control device associated with a second cell.

Furthermore, according to the present disclosure, provided is a method executed by a control device arranged on a local network side with respect to a gateway between an internet and a local network, the method including transmitting or receiving information regarding one or more sensor devices wirelessly connected to a first cell associated with the control device to or from another control device associated with a second cell.

According to the present disclosure, the control device is arranged on the local network side. Therefore, a load regarding communication between the control device and the sensor device can be suppressed, as compared with a case where the control device is arranged on the internet side. Furthermore, according to the present disclosure, the information regarding the sensor devices is transmitted or received between the control devices.

Therefore, information processing based on the information regarding the sensor devices can be performed by the control devices in a distributed manner.

EFFECTS OF THE INVENTION

As described above, according to the present disclosure, a mechanism capable of processing a service using a plurality of sensor devices in a distributed manner while suppressing a communication load and providing the service is provided. Note that the above-described effect is not necessarily limited, and any of effects described in the present specification or other effects that can be grasped from the present specification may be exerted in addition to or in place of the above-described effect.

MODE FOR CARRYING OUT THE INVENTION

Figure 1:
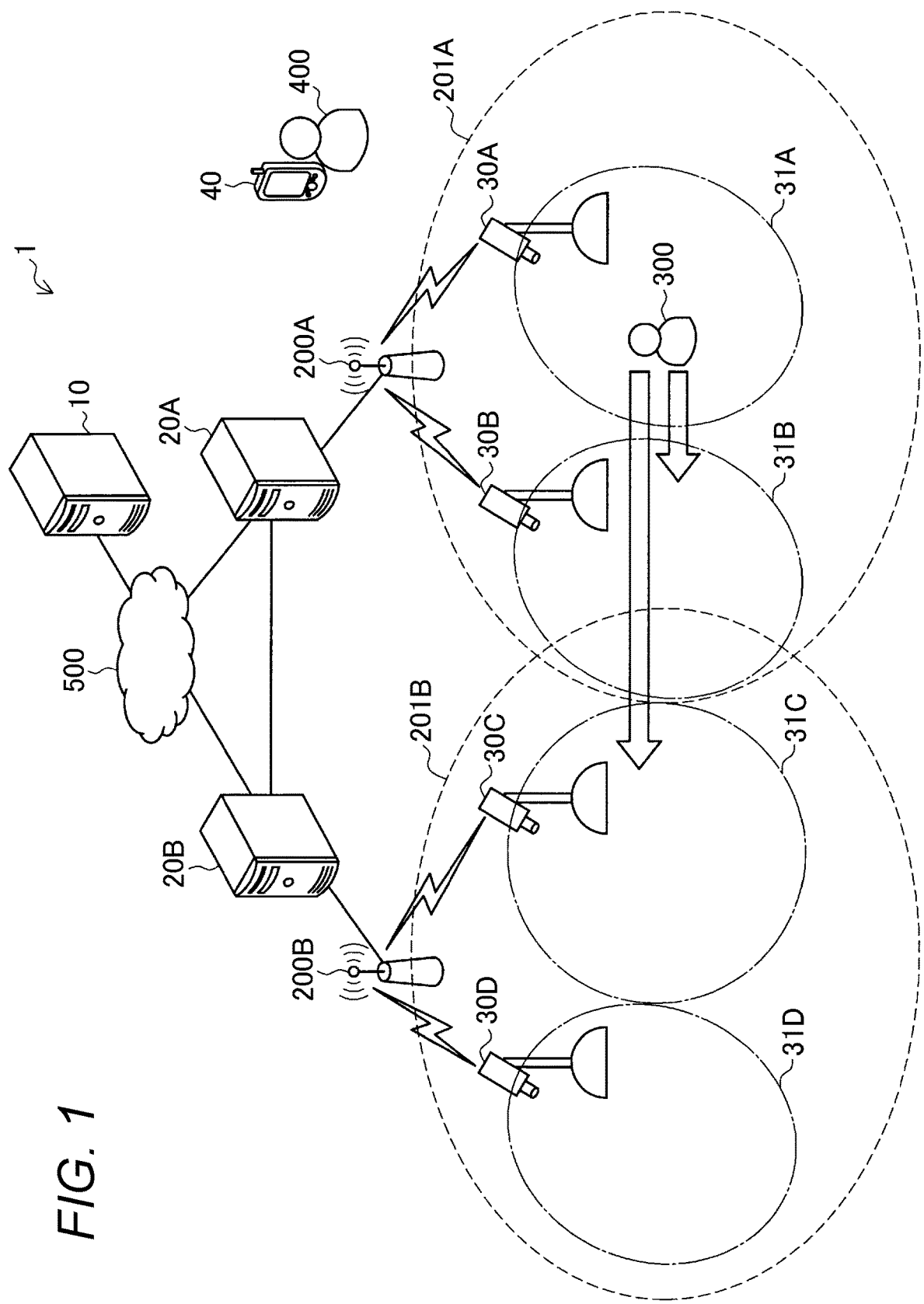
FIG. 1 is a diagram for describing an outline of a system according to an embodiment of the present disclosure.

Favorable embodiments of the present disclosure will be described in detail with reference to the appended drawings. Note that, in the present specification and drawings, redundant description of configuration elements having substantially the same functional configuration is omitted by providing the same sign.

Furthermore, in the present specification and the drawings, elements having substantially the same functional configuration may be distinguished by appending different alphabets to the same reference numeral. For example, a plurality of elements having substantially the same functional configuration is distinguished as the edge servers 20A and 20B as necessary. However, in a case where there is no need to distinguish the plurality of elements having substantially the same functional configuration, only the same reference numeral will be given. For example, in a case where there is no need to distinguish the edge servers 20A and 20B, the edge servers 20A and 20B are also simply referred to as edge servers 20.

Note that the description will be given in the following order.

1. Introduction
1.1. Outline of System
1.2. Technical Problems
2. Configuration Example
2.1. Device Configuration
2.2. Functional Configuration
3. Flow of Processing
3.1. Outline of Service Providing Processing
3.2. Processing According to Movement
3.2.1. First Scenario
3.2.2. Second Scenario
3.2.3. Third Scenario
3.2.4. Supplement
4. Reference Model Implementation Example
5. Application Example
5.1. First Application Example
5.2. Second Application Example
5.3 Third Application Example
6. Hardware Configuration Example
7. Conclusion

1. INTRODUCTION 1.1. Outline of System

FIG. 1 is a diagram for describing an outline of a system according to an embodiment of the present disclosure. As illustrated in FIG. 1, a system 1 according to the present embodiment includes a global server 10, a plurality of edge servers 20 (20A and 20B), a plurality of sensor devices 30 (30A to 30D) connected to the edge server 20, and a user device 40.

The global server 10 is a device that mediates exchange of information between the plurality of edge servers 20. The global server 10 may be installed on the Internet 500.

The edge server 20 is a control device arranged on a side of a local network with respect, to a gateway between the Internet 500 and the local network. The local network may be, for example, a core network in cellular communication, and the gateway may be a packet data network-gateway (P-GW) in long term evolution (LTE). Furthermore, the local network may be, for example, a local area network (LAN), and the gateway may be a gateway of a LAN and a wide area network (WAN).

One or more access points 200 are associated with the edge server 20. In other words, one or more cells are associated with the edge server 20. Then, the edge server 20 manages one or more sensor devices 30 wirelessly connected to the associated cell. For example, the edge server 20 causes the sensor device 30 under control to perform sensing and collects and processes sensing information from the sensor device 30 under control to provide a service to a user 400. Sensable ranges of one or more sensor devices 30 under control are collectively referred to as a management range of the edge server 20. Typically, different edge servers 20 are associated with difference access points 200. The edge server 20 may be included in or provided side by side with the access point 200, for example. Furthermore, the access point. 200 may include a main body (also referred to as a base station device) that controls wireless communication and one or more remote radio heads (RRHs) arranged at a location different from the main body. The edge server 20 may be included in or provided side by side with the main body.

The access point 200 operates a cell and provides a wireless service to one or more terminal devices located inside the cell. For example, an access point 200A provides a wireless service to each of sensor devices 30A and 30B located inside a cell 201A, and an access point 200B provides a wireless service to each of sensor devices 30C and 30D located inside a cell 201B. The cells can be operated according to any wireless communication scheme such as LTE, 5G new radio (NR), or a wireless LAN.

The sensor device 30 performs sensing to acquire sensing information. The sensor device 30 transmits the obtained sensing information to the edge server 20 that manages the sensor device 30. The sensor device 30 may perform sensing regarding a specific sensing target 300 on the basis of control by the edge server 20. An area or space that can be sensed by the sensor device 30 is also referred to as a sensable range 31 (31A to 31D). The sensable ranges 31 may have overlapping portions. Furthermore, the shape of the sensable range 31 may be different depending on a type of sensor.

The user device 40 is a terminal device operated by the user 400. The user device 10 performs processing for receiving provision of a service desired by the user 400. For example, the user device 40 requests the edge server 20 to provide a desired service and receives the service. The user device 40 may be connected to the edge server 20 via the Internet 500 or may be connected to the edge server 20 associated with the access point 200 via the access point 200.

The outline of each device included in the system. 1 has been described.

The system 1 provides the user 400 with a sensing service regarding the sensing target 300. For example, the system 1 continuously captures the sensing target 300 with the sensor device 30 around the sensing target 300 and delivers a captured video to the user device 40 in real time. The system 1 typically provides a subscription service. The subscription service is a type of service in which the user pays for a provided service. Typically, the user 400 signs a service contract in advance with a service provider and receives provision of a service that requires processing by the edge server 20 and sensing and the like by the sensor device 30, and pays for the provided service.

In the system 1 according to the present embodiment, the edge server 20 that collects the sensing information and provides a service is arranged in the local network. Since the distance between the sensor device 30 and the edge server 20 is short, the system 1 can provide the service without a delay.

However, the sensing target 300 does not stay in the sensable range 31 of one sensor device 30 and may move beyond the sensable range 31 and can further move beyond the management range of the edge server 20. Therefore, it is desirable to provide a mechanism for enabling continuous provision of a service without a delay even if such movement occurs.

1.2. Technical Problems

Figure 2:
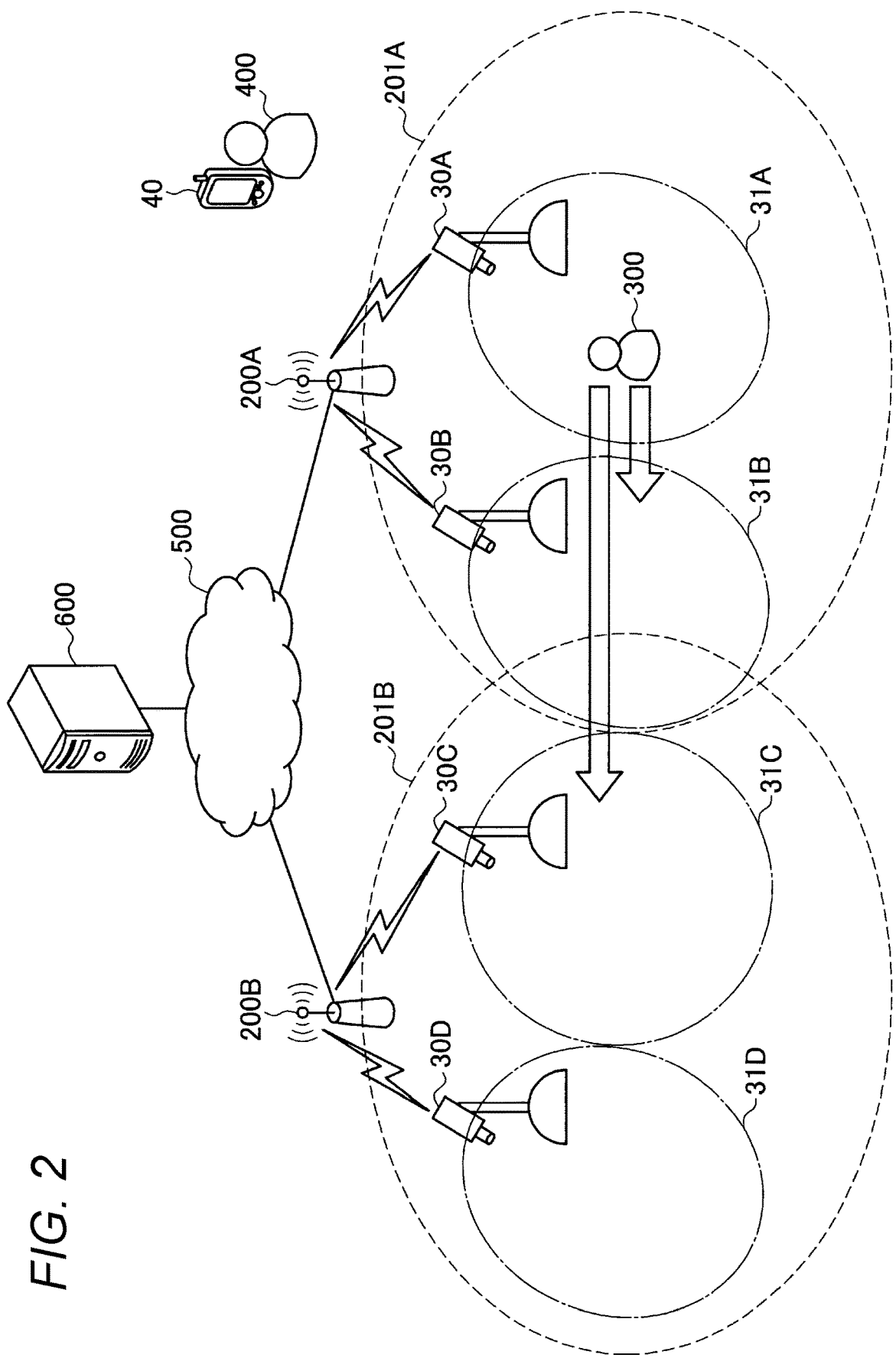
FIG. 2 is a diagram for describing an outline of a system according to a comparative example.

Similarly to the system 1, a configuration illustrated in FIG. 2 can also be considered as a system for providing a sensing service regarding the sensing target 300.

FIG. 2 is a diagram for describing an outline of a system according to a comparative example. As illustrated in FIG. 2, the system according to the comparative example does not include the edge server 20 illustrated in FIG. 1. Therefore, in the system according to the comparative example, a service provision server 600 on the Internet 500 collectively collects the sensing information sensed by the sensor devices 30 and provides a service.

Therefore, in the system according to the comparative example, occurrence of congestion in a communication line is considered as a large number of sensor devices 30 simultaneously provides the sensing information to the service provision server 600. Thus, the information is provided to the user device 40 in a delayed manner.

Here, in a case where the sensing target 300 has a dynamic property such as mobility, information to be provided to the user 400 can also dynamically change. In the above case where the information is provided to the user device 40 in a delayed manner due to the congestion of the communication line, the information provided to the user device 40 may be no longer valuable for the user 400.

Furthermore, the sensable range of the sensor device 30 and the coverage (in other words, the cell) of the access point 200 to which the sensor device 30 is wirelessly connected are restrictive. Due to such spatial limitations, the following situations can occur as obstacles to the continuous provision of the information provision service based on the sensing information.

The user device moves beyond the sensable range of the sensor device.

The user device moves beyond the coverage of the access point.

The user device requests information based on sensing information obtained outside the sensable range of the sensor device and the coverage of the access point.

The sensor device moves beyond the coverage of the access point.

The sensing target moves beyond the sensable range of the sensor device.

The sensing target moves beyond the coverage of the access point.

Thus, the present disclosure overcomes the above-described obstacles and provides a mechanism capable of continuously providing a consumer with an information provision service based on sensing information without a delay.

2. CONFIGURATION EXAMPLE

2.1. Device Configuration (1) Overall Configuration

Figure 3:
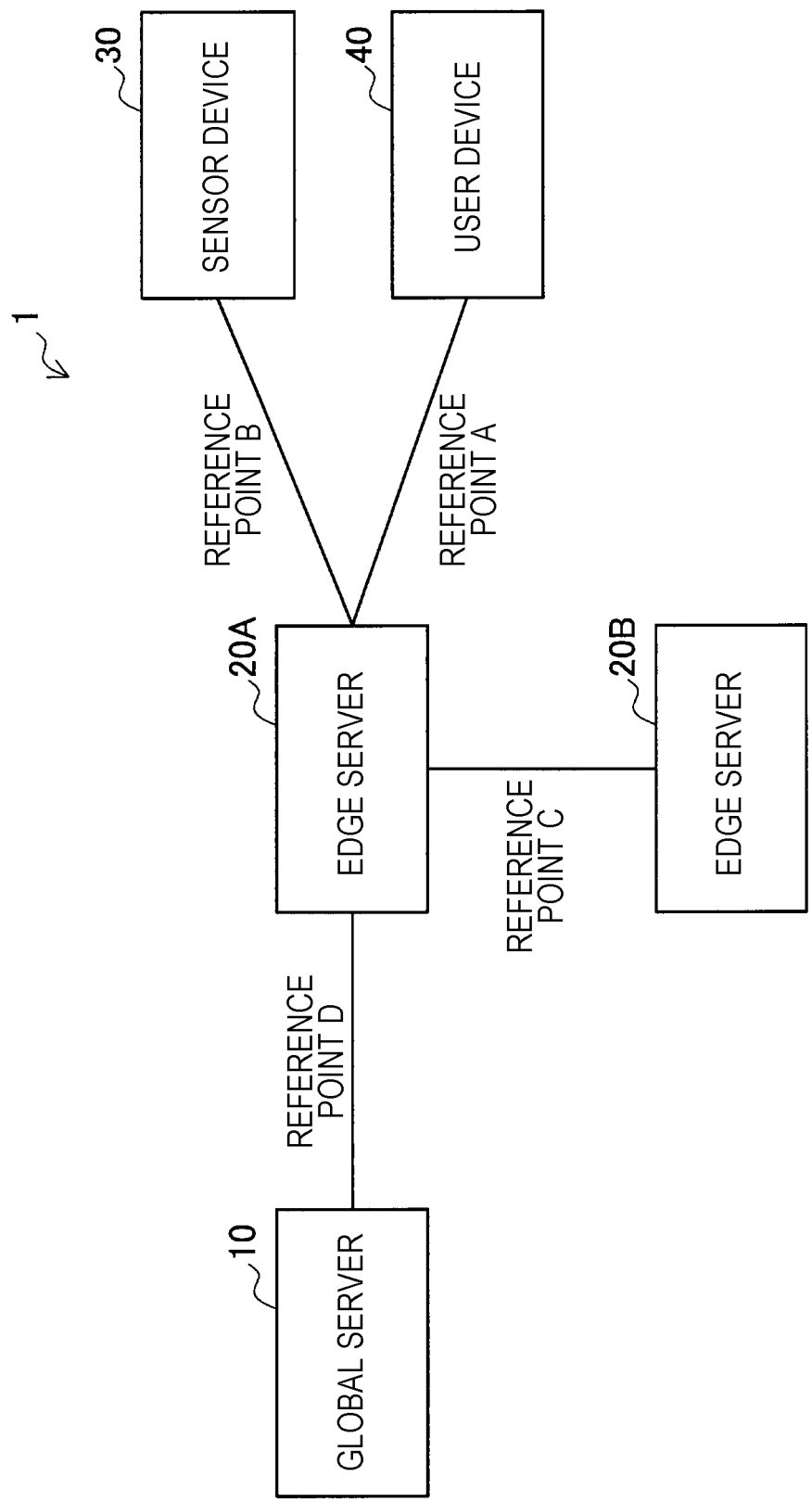
FIG. 3 is a diagram illustrating an example of a schematic configuration of a system according to the present embodiment.

FIG. 3 is a diagram illustrating an example of a schematic configuration of the system 1 according to the present embodiment. As illustrated in FIG. 3, the system 1 according to the present embodiment includes the global server 10, the edge servers 20 (20A and 20B), the sensor device 30, and the user device 40. These devices are also referred to as entities.

Contact points between the entities are also referred to as reference points. Specifically, the contact point between the edge server 20 and the user device 40 is also referred to as a reference point A. The contact point between the edge server 20 and the sensor device 30 is also referred to as a reference point B. The contact point between the edge servers 20 is also referred to as a reference point C. The contact point between the global server 10 and the edge server 20 is also referred to as a reference point D.

Each entity is defined by a functional role and the reference point. Hereinafter, a device configuration of each entity will be described.

(2) Global Server

The global server 10 is an entity that manages and controls one or more edge servers 20. Hereinafter, an example of a configuration of the global server 10 will be described with reference to FIG. 4.

Figure 4:
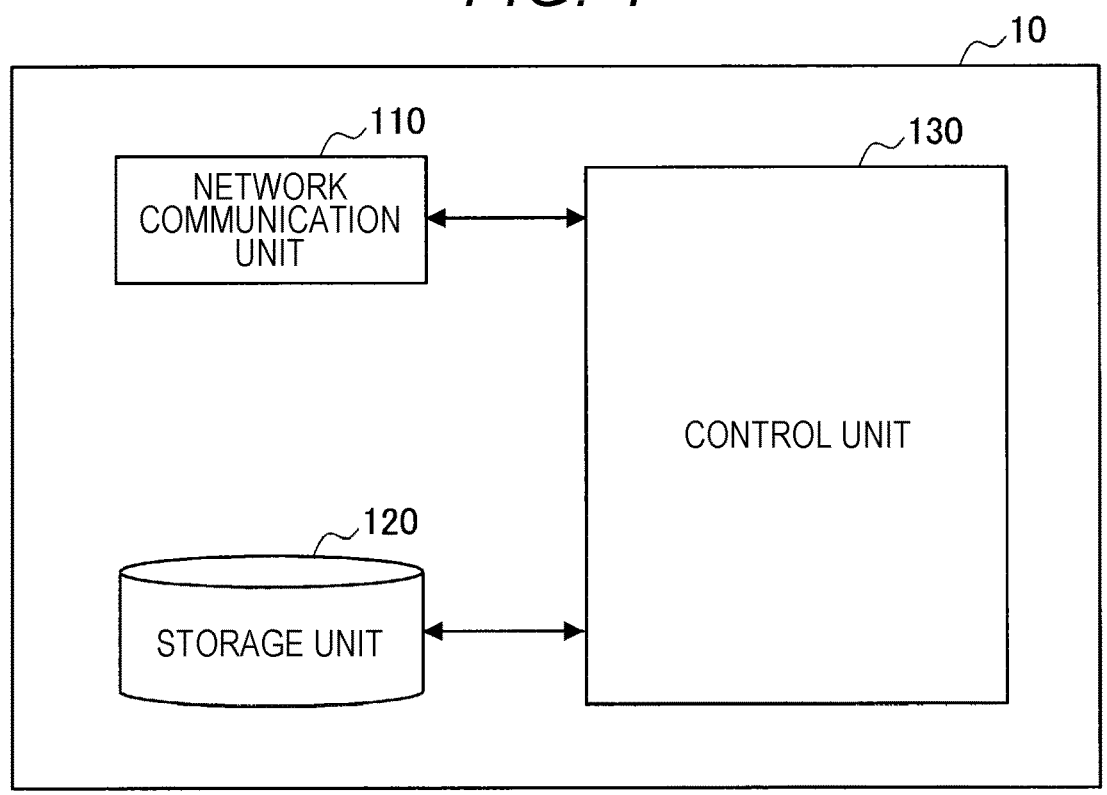
FIG. 4 is a block diagram illustrating an example of a configuration of a global server according to the present embodiment.

FIG. 4 is a block diagram illustrating an example of a configuration of the global server 10 according to the present embodiment. As illustrated in FIG. 4, the global server 10 includes a network communication unit 110, a storage unit 120, and a control unit 130.

The network communication unit 110 transmits and receives information. For example, the network communication unit 110 transmits information to another node and receives information from another node. For example, the another node includes the edge server 20.

The storage unit 120 temporarily or permanently stores programs and various data for the operation of the global server 10.

The control unit 130 provides various functions of the global server 10. For example, the control unit 130 performs processing of providing the edge server 20 with information regarding another edge server 20 present in a periphery, and providing information of another edge server 20 corresponding to a request from the edge server 20.

(3) Edge Server

The edge server 20 is an entity that collects the sensing information from the sensor device 30 and provides a service to the user device 40. Hereinafter, an example of a configuration of the edge server 20 will be described with reference to FIG. 5.

Figure 5:
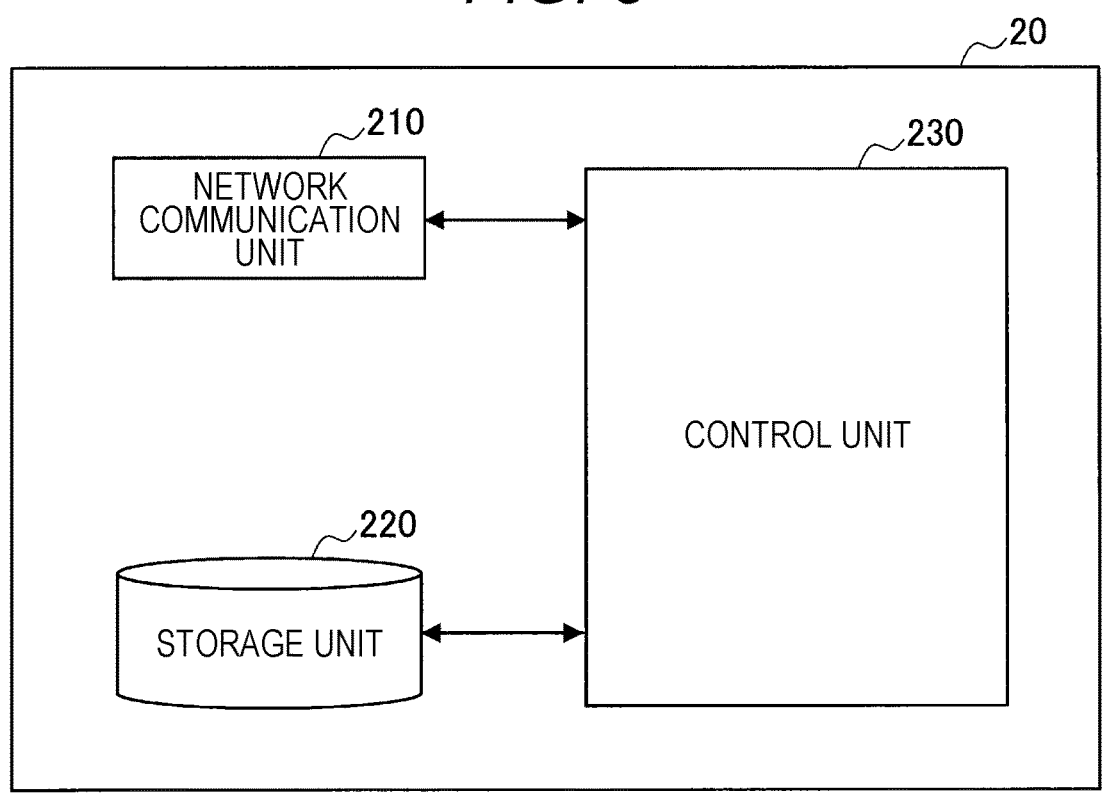
FIG. 5 is a block diagram illustrating an example of a configuration of an edge server according to the present embodiment.

FIG. 5 is a block diagram illustrating an example of a configuration of the edge server 20 according to the present embodiment. As illustrated in FIG. 5, the edge server 20 includes a network communication unit 210, a storage unit 220, and a control unit 230.

The network communication unit 210 transmits and receives information. For example, the network communication unit 210 transmits information to other nodes and receives information from other nodes. For example, the other nodes include the global server 10, another edge server 20, the sensor device 30, and the user device 40.

The storage unit 220 temporarily or permanently stores programs and various data for the operation of the edge server 20.

The control unit 230 provides various functions of the edge server 20. For example, the control unit 230 acquires the sensing information from the sensor device 30, processes, for example, the sensing information to generate service information, and provides the user device 40 with the generated service information. Furthermore, the control unit 230 transmits or receives information regarding one or more sensor devices 30 under control of the edge server 20 to or from the another edge server 20 to perform processing in cooperation with the another edge server 20.

(4) Sensor Device

The sensor device 30 is an entity that performs sensing and transmits the obtained sensing information to the edge server 20. Hereinafter, an example of a configuration of the sensor device 30 will be described with reference to FIG. 6.

Figure 6:
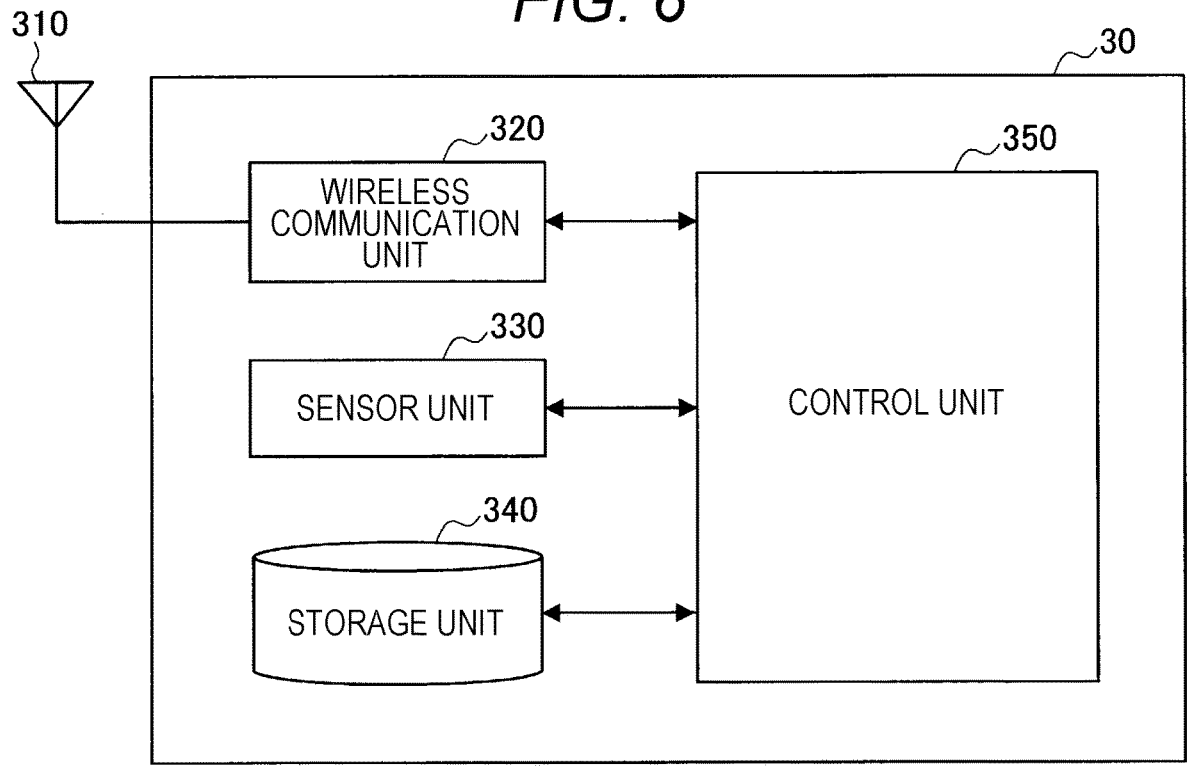
FIG. 6 is a block diagram illustrating as example of a configuration of a sensor device according to the present embodiment.

FIG. 6 is a block diagram illustrating an example of a configuration of the sensor device 30 according to the present embodiment. As illustrated in FIG. 6, the sensor device 30 includes an antenna unit 310, a wireless communication unit 320, a sensor unit 330, a storage unit 340, and a control unit 350.

The antenna unit 310 radiates a signal output from the wireless communication unit 320 into a space as a radio wave. Furthermore, the antenna unit 310 converts a radio wave in the space into a signal and outputs the signal to the wireless communication unit 320.

The wireless communication unit 320 transmits and receives a signal. For example, the wireless communication unit 320 receives a signal from the access point and transmits a signal to the access point.

The sensor unit 330 performs sensing to acquire the sensing information. The sensing is processing of acquiring information from an environment. The sensor unit 330 can include various sensors. For example, the sensor unit 330 may include an electric field sensor and measure an electric field strength in a specific frequency band of an installation position of the sensor device 30. Furthermore, the sensor unit 330 may include a camera and capture an image (a still image or a moving image) with respect to an environment around the installation position of the sensor device 30 or a specific target. Furthermore, the sensor unit 330 may include an environmental sensor such as a thermometer or a barometer and measure environmental information such as air temperature or atmospheric pressure. Of course, the sensor unit 330 can include any other sensors.

The storage unit 340 temporarily or permanently stores programs and various data for the operation of the sensor device 30.

The control unit 350 provides various functions of the sensor device 30. For example, the control unit 350 sets parameters of the sensing on the basis of the control by the edge server 20, acquires the sensing information, and reports the sensing information to the edge server 20.

(5) User Device

The user device 40 is an entity that receives provision of a service from the system 1. Hereinafter, an example of a configuration of the user device 40 will be described with reference to FIG. 7.

Figure 7:
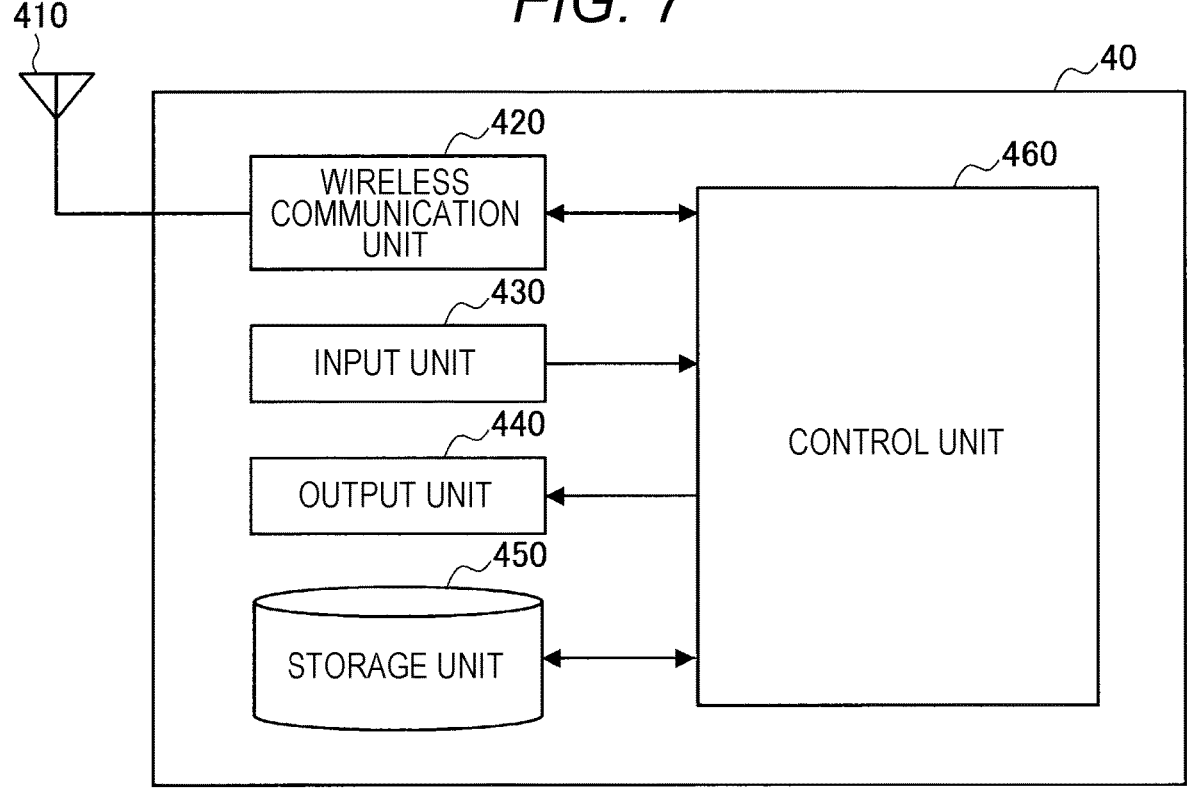
FIG. 7 is a block diagram illustrating an example of a configuration of a user device according to the present embodiment.

FIG. 7 is a block diagram illustrating an example of a configuration of the user device 40 according to the present embodiment. As illustrated in FIG. 7, the user device 40 includes an antenna unit 410, a wireless communication unit 420, an input unit. 430, an output unit 440, a storage unit 450, and a control unit 460.

The antenna unit 410 radiates a signal output from the wireless communication unit 420 into a space as a radio wave. Furthermore, the antenna unit 410 converts a radio wave in the space into a signal and outputs the signal to the wireless communication unit 420.

The wireless communication unit 420 transmits and receives a signal. For example, the wireless communication unit 420 receives a signal from the access point and transmits a signal to the access point.

The input unit 430 and the output unit 440 are interfaces with the user. The input unit 430 receives an input from the user and obtains input information indicating the user input. For example, the input unit 430 may include a physical key such as a keyboard or may include a sound input device for sound recognition. The output unit 440 outputs information to the user. For example, the output unit 440 may include a display device, a sound output device, a bone conduction output device, a vibration device, or the like. Furthermore, the input unit 430 and the output unit 440 may perform user interaction via different devices using a wireless interface.

The storage unit 450 temporarily or permanently stores programs and various data for the operation of the user device 40.

The control unit 460 provides various functions of the user device 40. The control unit 460 transmits information to the edge server 20 and performs output based on information received from the edge server 20 in order to receive provision of a service desired by the user.

The user device 40 may be, for example, a mobile phone, a smartphone, a tablet, a personal computer (PC), a wearable device, or the like. Note that the wearable device may be a wristband type, a wrist watch type, a headset type, a ring type, or the like.

2.2. Functional Configuration

Hereinafter, a functional configuration implemented in the devices of the system 1 according to the present embodiment will be described with reference to FIGS. 8 to 12.

(1) Functional Configuration of Entire System

Figure 8:
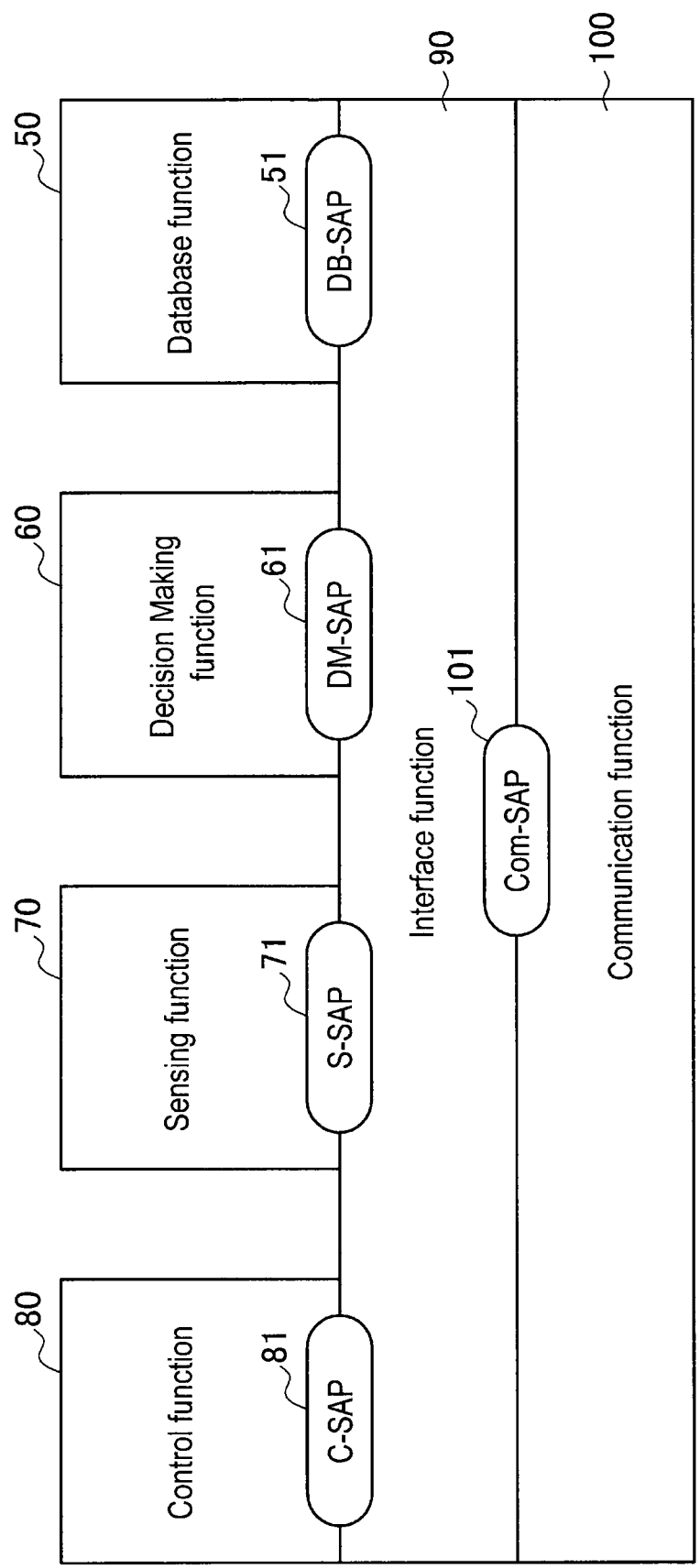
FIG. 8 is a diagram for describing a logical functional configuration of a system according to the present embodiment.

FIG. 8 is a diagram for describing a logical functional configuration of the system 1 according to the present embodiment. As illustrated in FIG. 8, the system 1 is configured by six logic function entities (a database function 50, a decision making function 60, a sensing function 70, a control function 80, an interface function 90, and a communication function 100), and five service access points (SAPs) (database (DB)-SAP 51, decision making (DM)-SAP 61, sensing (S)-SAP 71, control (C)-SAP 81, communication (Com)-SAP 101).

The database function 50 is a software or hardware module that stores the sensing information, a processing result of the sensing information, and information (auxiliary information) necessary for information generation. The database function 50 is typically provided by the global server 10. The service access point of the database function 50 is DB-SAP 51. The DB-SAP 51 is used by the interface function 90 to access a service provided by the database function 50, such as storage of the sensing information and the auxiliary information.

The decision making function 60 is a software or hardware module that processes the sensing information and generates information, for example. The decision making function 60 is typically provided by the edge server 20. The service access point of the decision making function 60 is the DM-SAP 61. The DM-SAP 61 is used by the interface function 90 to access a service provided by the decision making function 60, such as processing of the sensing information and the information generation.

The sensing function 70 is a software or hardware module that acquires the sensing information. The sensing function 70 is typically provided by the sensor device 30. The service access point of the sensing function 70 is S-SAP 71. The S-SAP 71 is used by the interface function 90 to access a service provided by the sensing function 70, such as acquisition of the sensing information. For example, the sensor device 30 using the S-SAP 71 acquires a command for setting parameters related to sensing from the edge server 20 and implements control of the sensor parameters.

The control function 80 is a software or hardware module that carries control for transmitting the auxiliary information to the global server 10 or the edge server 20 and for receiving notification of a determination result from the edge server 20. Control functionality 80 is typically provided by user device 40. The service access point of the control function 80 is C-SAP 81. The C-SAP 81 is mainly used by an application to access information of the global server 10 or the edge server 20. For example, the user device 40 using the C-SAP 81 becomes a consumer of the information of the global server 10 or the edge server 20 or plays a role of application control.

The communication function 100 is a software or hardware module for providing a communication protocol stack required for an interface between logical function entities and other communication services. The service access point of the communication function 100 is Com-SAP 101. The Com-SAP 101 exchanges and provides the sensing information, and exchanges the auxiliary information or other related information between the communication function 100 and the interface function 90. Furthermore, Com-SAP 101 has a role of abstracting a communication mechanism for use of the communication function 100 by the reference point, by defining a set of generic primitives and mapping these primitives to a transfer protocol. Therefore, the communication mechanism applied on implementation may be, for example, for a PHY/MAC layer, global system for mobile communications (GSM) (registered trademark), universal mobile telecommunications system (UMTS), long term evolution (LTE), new radio (NR) being studied in 5G or a later cellular system technology, or a wireless local area network (LAN) standard (IEEE 802.11a, b, n, g, ac, ad, af or ah) formulated in the IEEE 802.11 working group (WG) or a standard to be formulated in the future (IEEE 802.11ax, ay, or the like), an IEEE 802.16 WG, or an IEEE 802.15 WG. As a communication means for an upper layer, for example, communication may be performed on the basis of a hypertext transfer protocol (HTTP).

The interface function 90 is abstraction of integrity between functional blocks for realizing a reference access point between the global server 10 and the edge server 20, between the edge servers 20, between the edge server 20 and the sensor device 30, or between the edge server 20 and the user device 40. For the interface function 90, all of the SAPs (51, 61, 71, 81, and 101) are the service access points.

The logical functional configuration of the system 1 has been described above. Next, configuration examples of the respective reference points wall be described with reference to FIGS. 9 to 12.

(2) Configuration Example of Reference Point A

Figure 9:
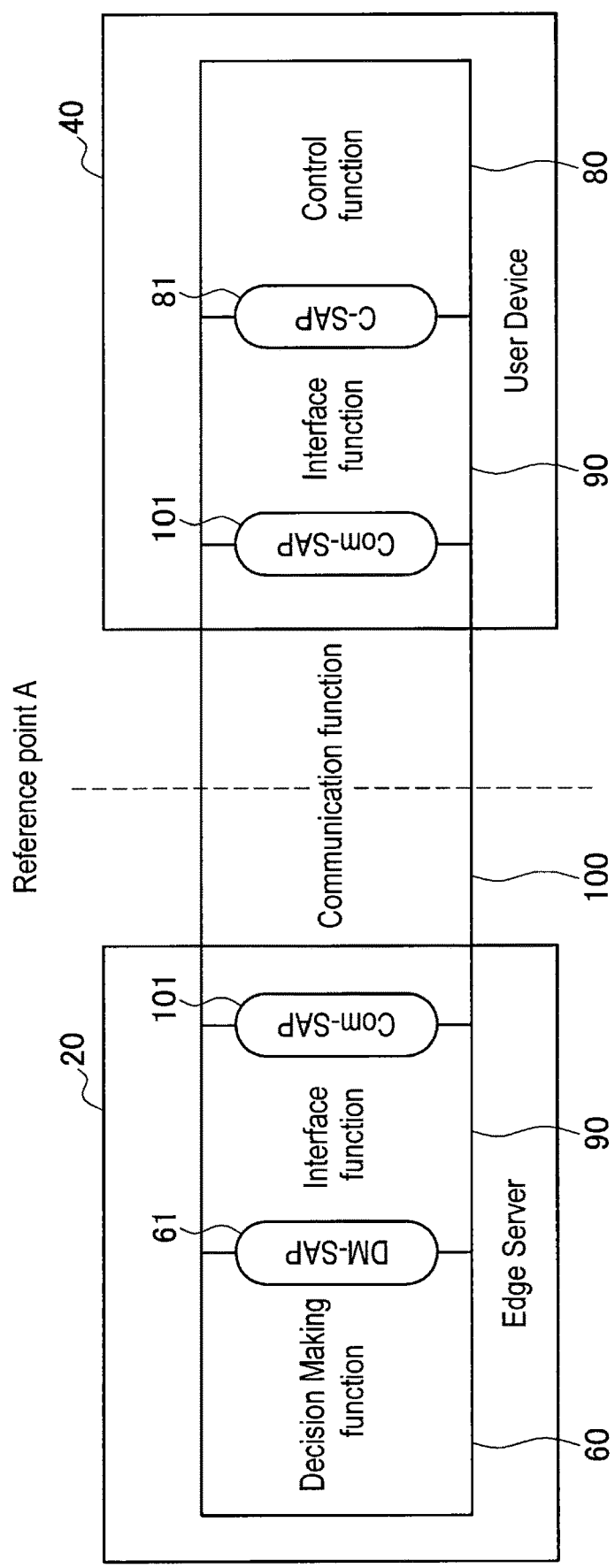
FIG. 9 is a diagram illustrating an example of configuration of a reference point A of the system according to the present embodiment.

FIG. 9 is a diagram illustrating an example of a configuration of the reference point A of the system 1 according to the present embodiment. As illustrated in FIG. 9, the decision making function 60 and the interface function 90 are mapped to the edge server 20, and the control function 80 and the interface function 90 are mapped to the user device 40. Then, the communication function 100 is mapped to the reference point A between the edge server 20 and the user device 40.

At the reference point A, the following information is transmitted from the user device 40 to the edge server 20, for example.

User device registration information
Service subscription information
User device position information
User authentication information
Service provision request
Sensing request The user device registration information is information registered in advance for the user device 40, and includes, for example, a telephone number, an e-mail address, and the like of the user device 40. The service subscription information is information for receiving provision of a subscription service, and includes, for example, contract information indicating a contract between the user and the service provider. The user device position information is information indicating a current position (latitude, longitude, altitude, and the like) of the user device 40. The user authentication information is authentication information for use of the subscription service, and includes identification information, a password, and the like of the user. The service provision request is a message for requesting start of the provision of the subscription service. For example, the service provision request can include information indicating service information to be generated. Furthermore, the service provision request can include information for identifying the sensing target. The sensing request is a message for requesting execution of sensing.

Furthermore, at the reference point A, the following information is transmitted from the edge server 20 to the user device 40, for example.

Service information
Sensing information
Edge server access information

The service information is information generated by processing the sensing information or the like in the edge server 20 in response to the service provision request, and includes, for example, a video of the sensing target and the like. The sensing information includes the sensing target (for example, a person, an animal, a thing), a sensing result. (for example, an electric field intensity, an image, a moving image, an air temperature), and the like. The sensing information may be raw data or may be a result of an analysis of the raw data, for example. The edge server access information is information for the user device 40 to be connected to the edge server 20, and includes, for example, an address of the edge server 20, and the like.

(3) Configuration Example of Reference Point B

Figure 10:
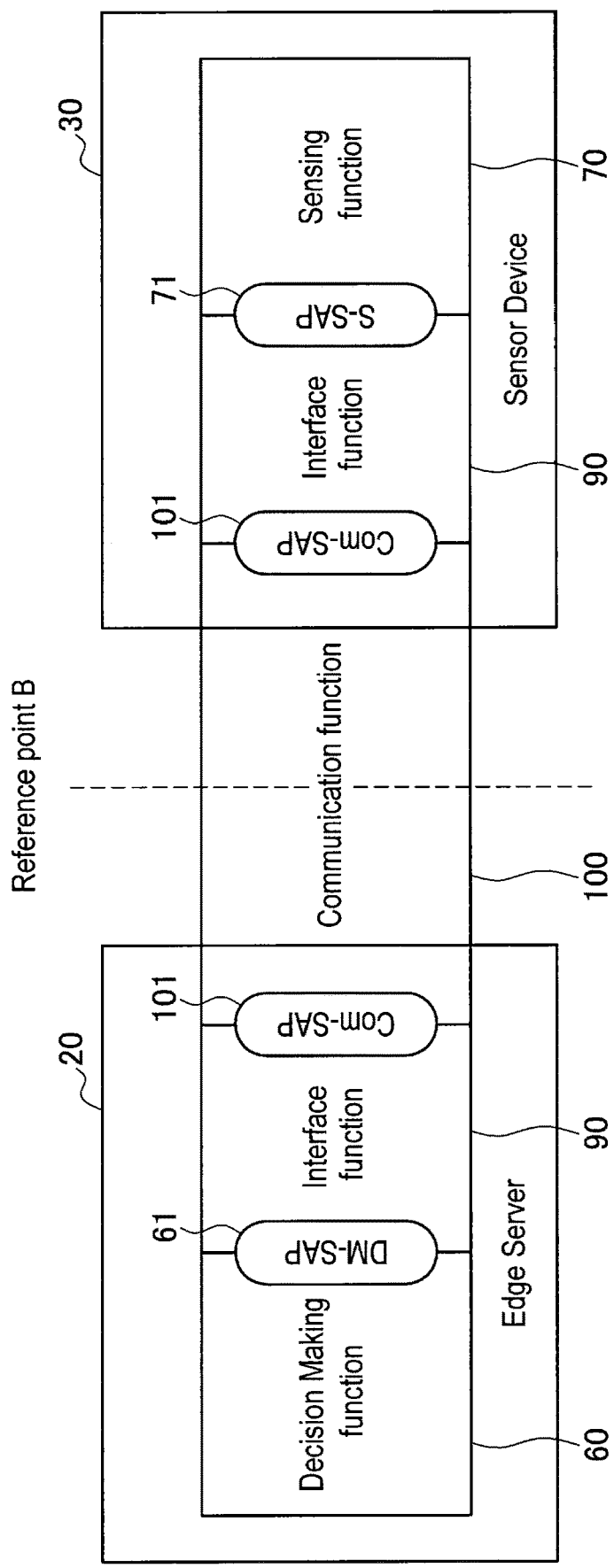
FIG. 10 is a diagram illustrating an example of a configuration of a reference point B of the system according to the present embodiment.

FIG. 10 is a diagram illustrating an example of a configuration of the reference point B of the system 1 according to the present embodiment. As illustrated in FIG. 10, the decision making function 60 and the interface function 90 are mapped to the edge server 20, and the sensing function 70 and the interface function 90 are mapped to the sensor device 30. Then, the communication function 100 is mapped to the reference point B between the edge server 20 and the sensor device 30.

At the reference point B, the following information is transmitted from the sensor device 30 to the edge server 20, for example.

Sensor registration information
Sensor position information
Sensor operation parameter information
Sensing information The sensor registration information is information registered in advance for the sensor device 30, and includes, for example, information indicating a charge for use of the sensor device 30 and the like. The sensor position information is information indicating a current position (latitude, longitude, altitude, and the like) of the sensor device 30. The sensor operation parameter information is information indicating a parameter used for sensing currently performed by the sensor device 30. The sensor operation parameter information includes, for example, a sensing area (for example, a direction), the sensing target. (for example, a person, an animal, or a thing), a sensing parameter (for example, a radio wave, an image, a moving image, temperature, or the like), and the like.

At the reference point B, the following information is transmitted from the edge server 20 to the sensor device 30, for example.

Sensing request
Sensing operation parameter setting request
Information regarding the sensing target The sensing operation parameter setting request is a message for specifying a sensing operation parameter to be set. The information regarding the sensing target includes, for example, identification information, characteristic information of an image (for example, a face image), a voiceprint, or the like, mobility, attribute information, and the like, of the sensing target.

(4) Configuration Example of Reference Point C

Figure 11:
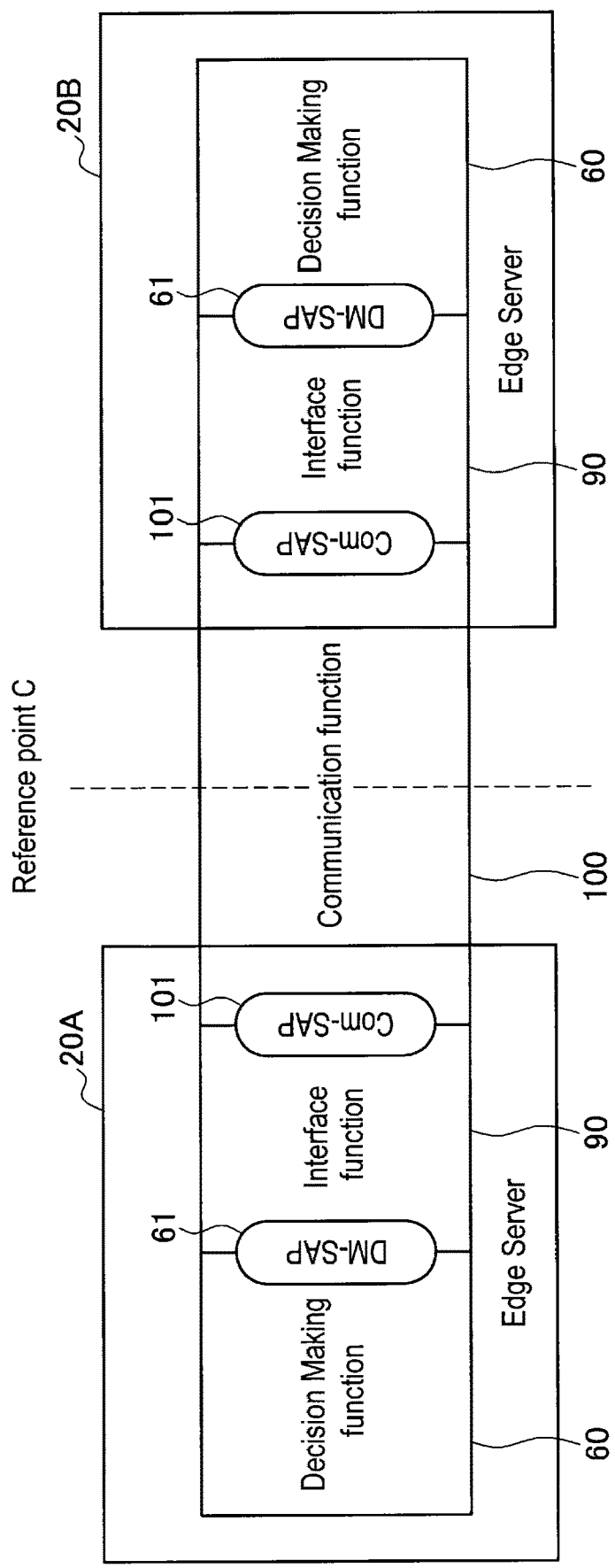
FIG. 11 is a diagram illustrating an example of a configuration of a reference point C of the system according to the present embodiment.

FIG. 11 is a diagram illustrating an example of a configuration of the reference point C of the system 1 according to the present embodiment. As illustrated in FIG. 11, the decision making function 60 and the interface function 90 are mapped to the edge server 20A, and similarly, the decision making function 60 and the interface function 90 are mapped to the edge server 20B. Then, the communication function 100 is mapped to the reference point C between the edge server 20A and the edge server 20B.

At the reference point C, information regarding one or more sensor devices 30 under control of the edge server 20 is transmitted or received to or from another edge server 20. Specifically, at the reference point C, the following information is transmitted from the edge server 20A to the edge server 20B, or from the edge server 20B to the edge server 20A, for example.

Request of information necessary for determination with service provision
User device registration information
Service subscription information of the user
Position information of the user device
User authentication information
Sensor information
Sensor position information
Sensor operation parameter information
Sensing information
Information regarding the sensing target The information necessary for determination with service provision includes, for example, information regarding the sensor device 30 under control of another edge server 20 and the like. The sensor information includes, for example, information indicating a type, performance, and the like of the sensor included in the sensor device 30.

(5) Configuration Example of Reference Point D

Figure 12:
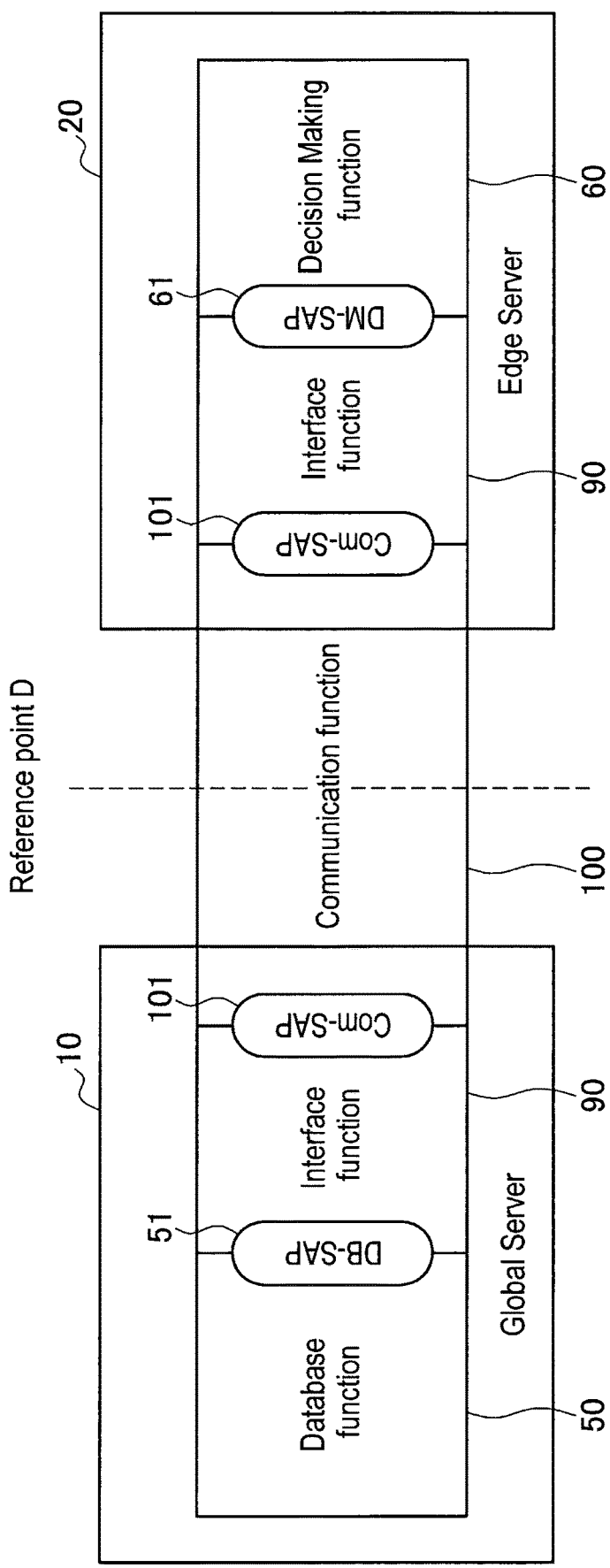
FIG. 12 is a diagram illustrating an example of configuration of a reference point D of the system according to the present embodiment.

FIG. 12 is a diagram illustrating an example of a configuration of the reference point D of the system 1 according to the present embodiment. As illustrated in FIG. 12, the database function 50 and the interface function 90 are mapped to the global server 10, and the decision making function 60 and the interface function 90 are mapped to the edge server 20. Then, the communication function 100 is mapped to the reference point D between the global server 10 and the edge server 20.

At the reference point D, the following information is transmitted from the edge server 20 to the global server 10, for example.

User device registration information
Service subscription information of the user
User device position information
User authentication information Sensor information
Sensor position information.
Sensor operation parameter information
Sensing information
User device search request
Sensor search request
Edge server search request The user device search request is a message requesting a search for the user device 40, and includes, for example, identification information of the user device 40 and the like. The sensor search request is a message for requesting a search for the sensor device 30, and includes, for example, position information, information for specifying the sensable range, information regarding the sensing target, and the like. The edge server search request is a message for requesting a search for the edge server 20, and includes information for specifying the management range and the like.

At the reference point D, the following information is transmitted from the global server 10 to the edge server 20, for example.

User device search result.
Sensor search result
Edge server search result

The user device search result is a response to the user device search request, and includes, for example, position information of the searched user device 40 and the like. The sensor search result is a response to the sensor search request, and includes, for example, identification information and position information of the searched sensor device 30, information indicating the edge server 20 of the management source, and the like. The edge server search result is a response to the edge server search request, and includes, for example, identification information of the searched edge server 20, information indicating the management range, and the like.

3. FLOW OF PROCESSING

3.1. Outline of Service Providing Processing

The user device 40 first performs subscription in order to receive provision of a service from the system 1. With the subscription, the system 1 performs preliminary preparation for providing the service to the user device 40, such as selection of an appropriate sensor device 30 and parameter setting. Thereafter, the system 1 starts provision of the service to the user device 40. A series of processing will be described below.

Figure 13:
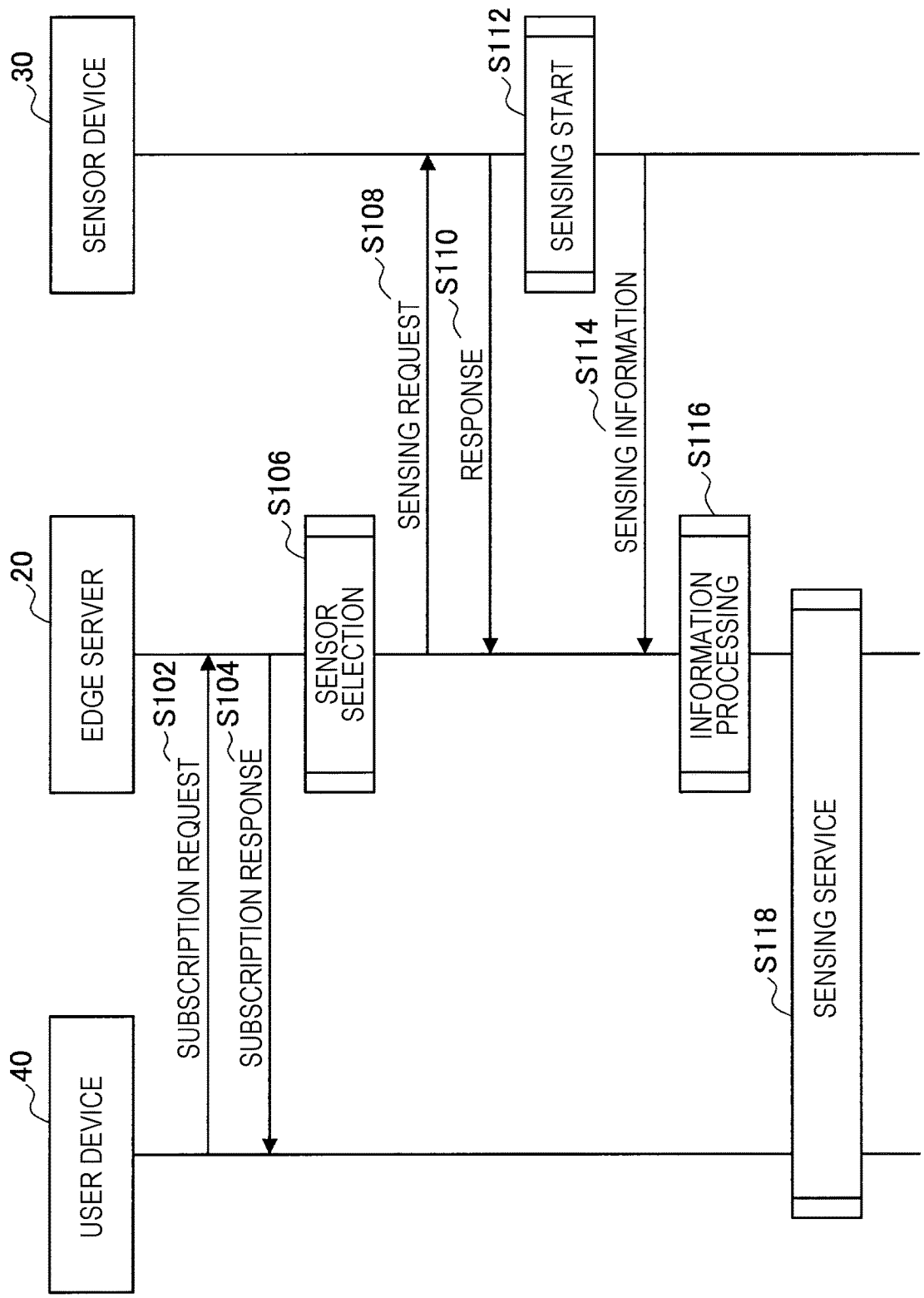
FIG. 13 is a sequence diagram illustrating an example of a flow of service providing processing executed in the system according to the present embodiment.

FIG. 13 is a sequence diagram illustrating an example of a flow of service providing processing executed in the system 1 according to the present embodiment. As illustrated in FIG. 13, the edge server 20, the sensor device 30, and the user device 40 are involved in the present sequence.

First, the user device 10 transmits a subscription request to the edge server 20 (step S102). The subscription request includes information for preliminary preparation, such as the user device registration information, the user authentication information, and the service subscription information, for example. A transmission trigger of the subscription request can be considered in various ways. For example, the subscription request may be transmitted in a case where a button arranged on a GUI of application software or a web page for a sensing service, which is displayed on the user device 40, pressed. Furthermore, a creation application of a user account in the application software or the web page for a sensing service from the user device 40 may be treated as the subscription request.

Next, the edge server 20 transmits a subscription response to the user device 40 (step S104).

Next, the edge server 20 performs sensor selection on the basis of the subscription request received from the user device 40 (step S106). For example, the edge server 20 selects the sensor device 30 capable of properly sensing the sensing target requested in the subscription request.

Next, the edge server 20 transmits a sensing request to the selected sensor device 30 (step S108).

Next, the sensor device 30 transmits a response to the edge server 20 (step S110).

Next, the sensor device 30 starts sensing based on the sensing request (step S112) and appropriately transmits the sensing information to the edge server 20 (step S114). For example, in a case where the sensor device 30 has a camera, the sensor device 30 performs presetting such as directing a lens to the sensing target, setting a capture mode, and then starts capture. Then, the sensor device 30 transmits the captured image to the edge server 20 at predetermined intervals or performs streaming delivery in real time.

Next, the edge server 20 performs information processing based on the sensing information acquired from the sensor device 30 (step S116) and provides a sensing service to the user device 40 (step S118). For example, the edge server 20 selects a sensor device 30 (corresponding to a first sensor device) capable of sensing the sensing target on the basis of a request from the user device 40, generates the service information on the basis of the sensing information of the selected sensor device 30, and provides the service information to the user device 40. The request may include the subscription request. For example, the edge server 20 performs user authentication in response to the subscription request, and selects the sensor device 30 according to the contract. Furthermore, the request may include the service provision request. For example, the edge server 20 identifies the sensing target in response to the service provision request, and generates the service information regarding the sensing target. The edge server 20 may process the sensing information for generation of the service information or may adopt the sensing information as it is without processing. Note that the service provision request may be transmitted along with the subscription request or may be transmitted at any time after transmission of the subscription request.

There are various conceivable methods for providing the sensing service to the user in the user device 40. For example, the edge server 20 may perform push notification regarding the sensing service, and notification content may be given in notification to the user via a user interface provided by the user device 40. For example, the user device 40 can notify the user by a method such as displaying as an icon on the screen, vibrating, or playing a sound.

3.2. Processing According to Movement

Hereinafter, processing according to movement of the sensing target or the user device 40 in the system 1 will be described.

<3.2.1. First Scenario>

A first scenario is a scenario in which the sensing target moves within the management range of the edge server 20 and beyond the sensable range of the sensor device 30.

Figure 14:
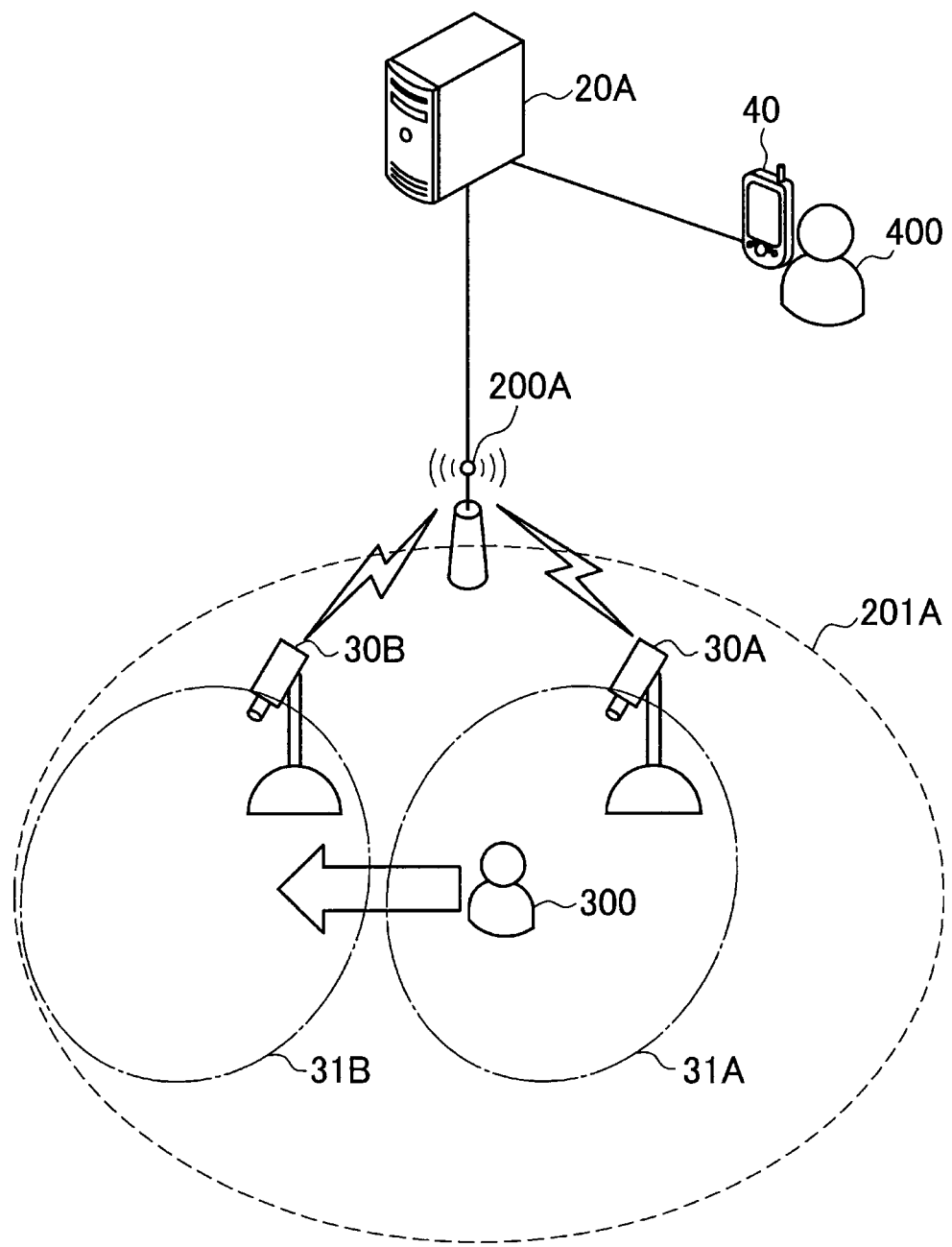
FIG. 14 is a diagram for describing an outline of a first scenario.

FIG. 14 is a diagram for describing an outline of a first scenario. In FIG. 14, a configuration involved in the description of the present scenario is extracted from an overall configuration illustrated in FIG. 1. In the example illustrated in FIG. 14, the sensing target 300 moves from the sensable range 31A of the sensor device 30A under control of the edge server 20A to the sensable range 31B of the sensor device 30B under control of the edge server 20A. Furthermore, the user device 40 is connected to the edge server 20A. The user device 40 can receive provision of a sensing service from the edge server 20A. For example, the edge server 20A generates the service information on the basis of an image of the sensing target 300 and provides the service information to the user device 40.

In the first scenario, the sensing target 300 moves beyond the sensable range (for example, a capturable range) of a specific sensor device 30. Note that, in the first scenario, a second sensor device 30 having the moved sensing target included in the sensable range has the same managing edge server 20 with the first sensor device 30 having the sensing target included in the sensable range before the movement. Therefore, in the case where the sensing target moves from the sensable range of the first sensor device 30 to the sensable range of the second sensor device 30, the edge server 20 transmits the information regarding the sensing target to the second sensor device 30. With the transmission, the edge server 20 can hand over the sensing of the sensing target to the second sensor device 30, the first sensor device 30 having a difficulty in continuing the sensing.

Hereinafter, as an example, a procedure in a case where the sensing target 300 located in the sensable range 31A of the sensor device 30A moves beyond the sensable range 31A to the sensable range 31B of the sensor device 30B will be described.

Hereinafter, the processing in the first scenario will be described. Note that, hereinafter, a first example in which determination processing by the edge server 20A is a starting point, and a second example in which determination processing by the sensor device 30 is a starting point will be described.

First Example

Figure 15:
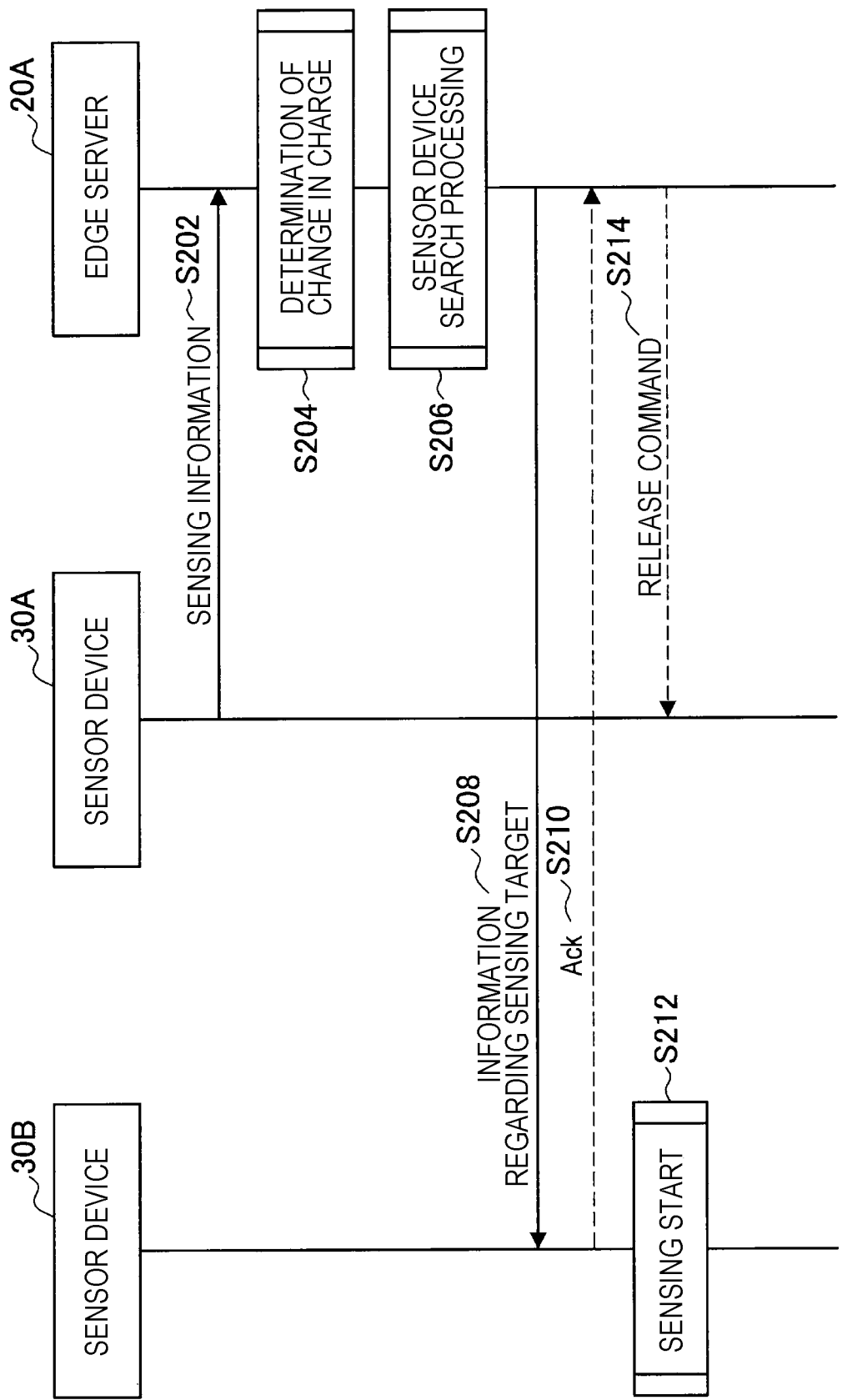
FIG. 15 is a sequence diagram illustrating an example of a flow of service providing processing in the first scenario executed in the system according to the present embodiment.

FIG. 15 is a sequence diagram illustrating an example of a flow of the service providing processing in the first scenario executed in the system 1 according to the present embodiment. As illustrated in FIG. 15, the sensor device 30A, the sensor device 30B, and the edge server 20A are involved in the present sequence. Note that, in FIG. 15, characteristic processing in the present scenario is extracted, and processing having a weak relationship with the present scenario, such as transmission of the subscription request, is omitted. The subsequent sequences are described in a similar manner.

First, the sensor device 30A transmits the sensing information to the edge server 20A (step S202). For example, the sensor device 30A uploads a captured image of the sensing target 300 to the edge server 20A.

Next, the edge server 20A makes a determination of change in charge on the basis of the sensing information received from the sensor device 30A (step S204). For example, the edge server 20A estimates information indicating the sensing target 300, a characteristic amount, position information, a moving speed, and the like on the basis of the sensing information. In the estimation, an analysis technology such as image analysis or pattern recognition may be used, or a learning technology such as machine learning using past sensing information may be used. Furthermore, the service subscription information from the user device 40 or information acquired from a position identification device (such as a global positioning system (GPS) or a global navigation satellite system (GNSS)) may be used for the estimation. Then, the edge server 20A determines whether or not the sensor device 30A continues the sensing of the sensing target 300 on the basis of the estimated information, information regarding the sensable range 31A of the sensor device 30A. In a case where it is determined that the sensing by the sensor device 30A should be continued, the sensing by the sensor device 30A is continued as it is.

On the other hand, in a case where it is determined that the sensing by the sensor device 30A should not be continued, the edge server 20A performs sensor device search processing for searching for a changed sensor device 30 in charge (step S206). For example, in a case where the sensing target is predicted to be out of the sensable range 31A of the sensor device 30A after a predetermined time, or the like, the edge server 20A determines that the sensor should not be continued. Then, the edge server 20A searches for the changed sensor device 30 in charge on the basis of the information indicating the sensing target 300, the characteristic amount, the position information, and the moving speed, and position information of another sensor device 30. Specifically, first, the edge server 20A identifies adjacent other sensor devices 30 on the basis of the position information of the sensor device 30A. Next, the edge server 20A estimates which sensable range of a sensor device 30 among the adjacent other sensor devices 30 the sensing target 300 will move to on the basis of the moving speed and a moving direction of the sensing target 300, thereby determining the changed sensor device 30 in charge. Here, it is assumed that the edge server 20A determines the sensor device 30B as the changed sensor device 30 in charge.

Thereafter, the edge server 20A transmits the information regarding the sensing target to the sensor device 30B (step S208).

The sensor device 30B transmits an ACK (acknowledgement response) to the edge server 20A (step 210) and starts sensing of the sensing target 300 (step S212). Here, in a case where parameter setting has been made such that the sensor device 30A follows the sensing target 300, the edge server 20A may notify the sensor device 30A of a release command to release the parameter setting (step S214).

Second Example

Figure 16:
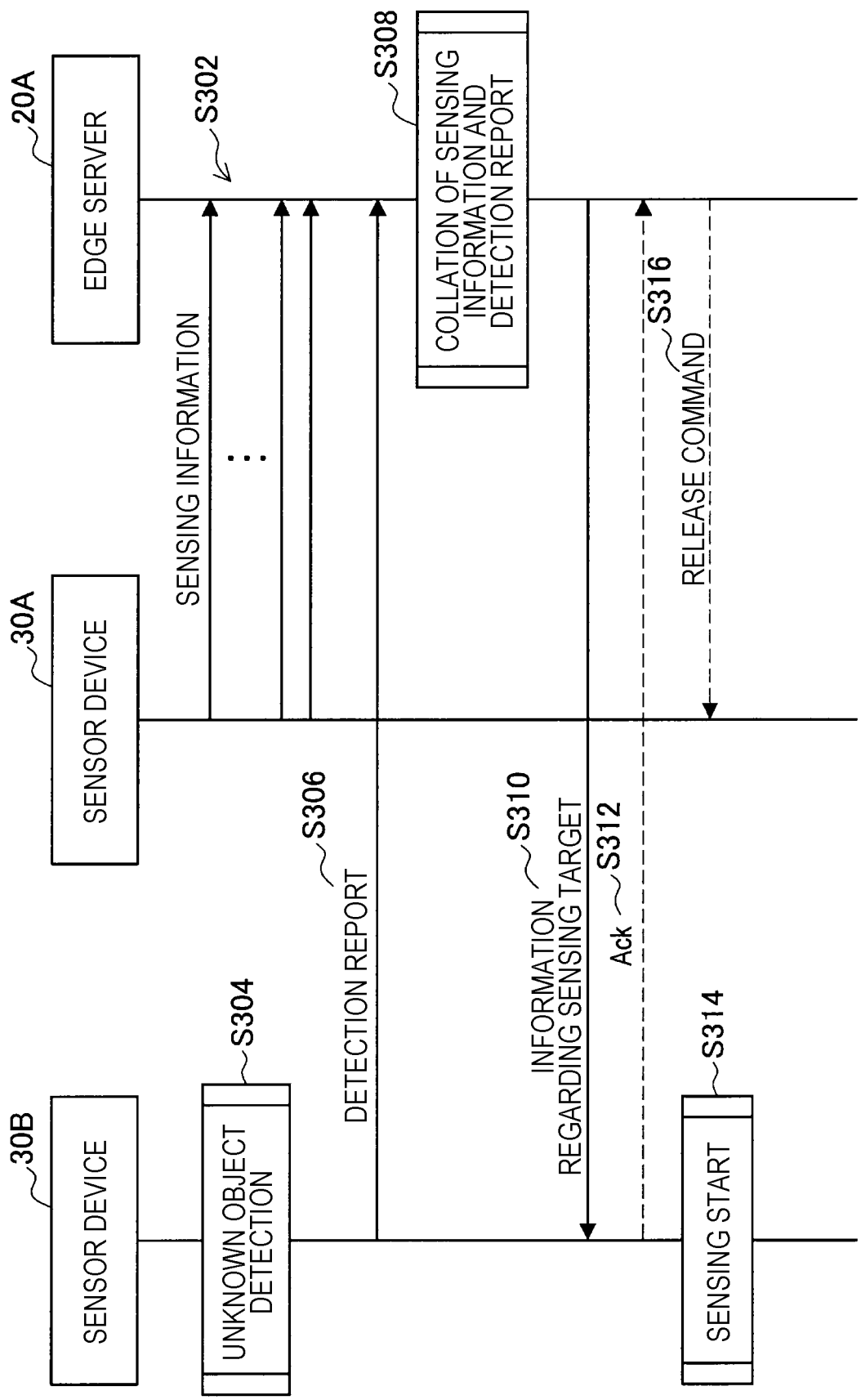
FIG. 16 is a sequence diagram illustrating an example of a flow of the service providing processing in the first scenario executed in the system according to the present embodiment.

FIG. 16 is a sequence diagram illustrating an example of a flow of the service providing processing in the first scenario executed in the system 1 according to the present embodiment. As illustrated in FIG. 16, the sensor device 30A, the sensor device 30B, and the edge server 20A are involved in the present sequence.

First, the sensor device 30A appropriately transmits the sensing information to the edge server 20A (step S302). For example, the sensor device 30A uploads the captured image of the sensing target 300 to the edge server 20A at predetermined intervals.

During the upload, it is assumed that the sensing target 300 has moved from the sensable range 31A of the sensor device 30A to the sensable range 31B of the sensor device 30B.

Then, the sensor device 309 detects the sensing target 300 as an unknown object (step S304) and transmits a detection report to the edge server 20A (step S306). The detection report can include, for example, position information at which the unknown object is detected, an image of the unknown object, and the like.

Next, the edge server 20A collates the information included in the received detection report with the sensing information held by the edge server 20A (for example, the sensing information received from the sensor device 30A and accumulated) and identifies that the unknown object is the sensing target 300 (step S308).

Thereafter, the edge server 20A transmits the information regarding the sensing target to the sensor device 30B (step S310).

The sensor device 30B transmits an ACK to the edge server 20A (step S312) and starts sensing of the sensing target 300 (step S314). Here, in a case where parameter setting has been made such that the sensor device 30A follows the sensing target 300, the edge server 20A may notify the sensor device 30A of a release command to release the parameter setting (step S316).

The first and second examples have been described above. By the above-described procedure, the sensing information can be continuously acquired without a delay even if the sensing target moves within the management range of the same edge server 20. Thereby, the edge server 20 can continuously provide a service to the user.

<3.2.2. Second Scenario>

A second scenario is a scenario in which the sensing target moves beyond the management range of the edge server 20.

Figure 17:
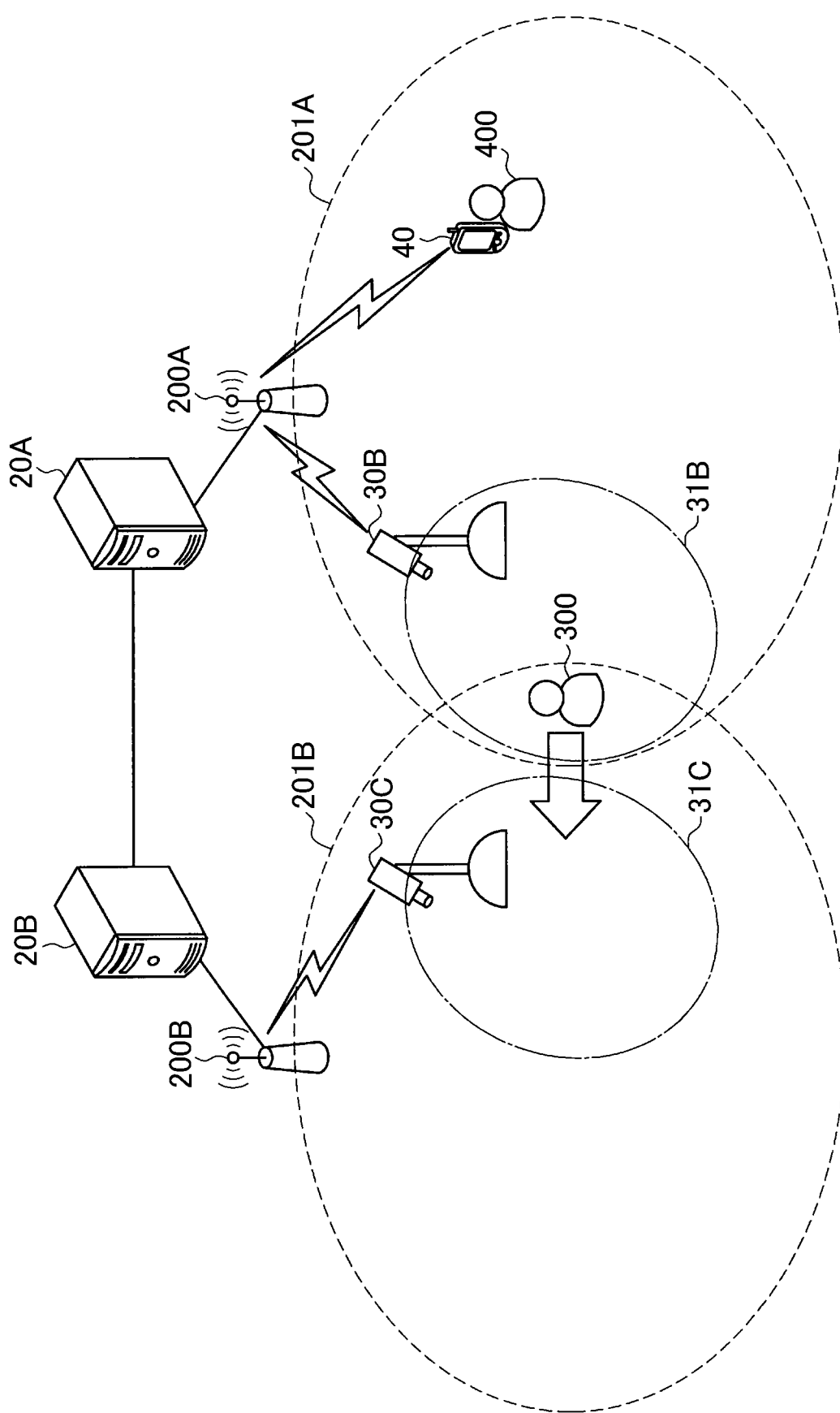
FIG. 17 is a diagram for describing an outline of a second scenario.

FIG. 17 is a diagram for describing an outline of the second scenario. In FIG. 17, a configuration involved in the description of the present scenario is extracted from the overall configuration illustrated in FIG. 1. In the example illustrated in FIG. 17, the sensing target 300 moves from the sensable range 31B of the sensor device 30B under control of the edge server 20A to the sensable range 31C of the sensor device 30C under control of the edge server 20B. Furthermore, the user device 40 is connected to the edge server 20A via the access point 200A.

In the second scenario, the sensing target moves beyond the management range the edge server 20. Therefore, in the second scenario, the second sensor device 30 having the moved sensing target included in the sensable range has a different managing edge server 20 from the first sensor device 30 having the sensing target included in the sensable range before the movement. Therefore, in a case where the second sensor device 30 is connected to a second cell, the edge server 20 transmits the information regarding the sensing target to another edge server 20 associated with the second sensor device 30. Typically, the information regarding the sensing target transmitted to the another edge server 20 is transferred to the second sensor device 30. With the transmission, a certain edge server 20 can hand over the sensing of the sensing target to the second sensor device 30 under control of a different edge server 20, the first sensor device 30 under control of the certain edge server 20 having a difficulty in continuing the sensing. In particular, after the edge server 20 specifies that the sensing target has moved to the sensable range of the second sensor device 30, the edge server 20 transmits the information regarding the sensing target to the another edge server 20 associated with the second sensor device 30. In other words, the edge server 20 transmits the information regarding the sensing target only to the another edge server 20 that has been determined to be a moving destination of the sensing target. Thereby, unnecessary spreading of a face image and the like of the sensing target can be prevented.

In a case of recognizing the movement of the sensing target on the basis of the sensing information of the first sensor device 30 (in other words, in the case of the first example described below), the edge server 20 transmits a request for searching for the second sensor device 30 to the another edge server 20. With the transmission, the edge server 20 can cause the another edge server 20 to search for the second sensor device 30 appropriate as a handover destination.

In a case of recognizing the movement, of the sensing target on the basis of the sensing information of the second sensor device 30 (in other words, in the case of the second example described below), the edge server 20 receives a request for searching for the first sensor device 30 from the another edge server 20. This request requests, by the another edge server 20, a search for the sensor device 30 in charge that has been responsible for the sensing until then of the unknown object sensed by the second sensor device 30 under control. With the request, the edge server 20 can recognize that the sensing target sensed by the first sensor device 30 has moved to the sensable range of the second sensor device 30. Then, the edge server 20 can request the second sensor device 30 to take over the sensing.

Hereinafter, the processing in the second scenario will be described. Note that, hereinafter, a first example in which determination processing by the edge server 20A is a starting point, and a second example in which determination processing by the sensor device 30 is a starting point will be described.

First Example

Figure 18:
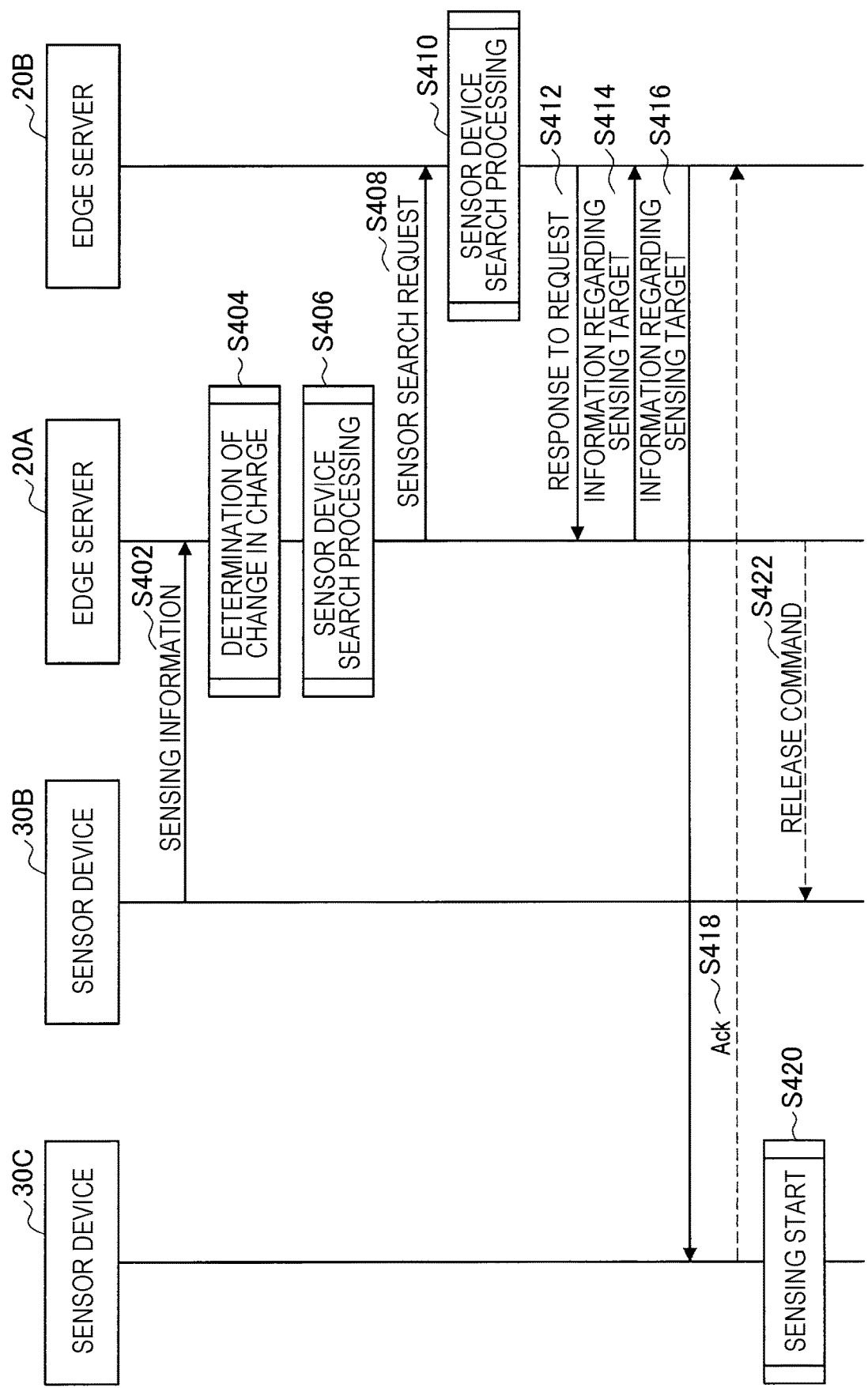
FIG. 18 is a sequence diagram illustrating an example of a flow of service providing processing in the second scenario executed in the system according to the present embodiment.

FIG. 18 is a sequence diagram illustrating an example of a flow of service providing processing in the second scenario executed in the system 1 according to the present embodiment. As illustrated in FIG. 18, the sensor device 30B, the sensor device 30C, the edge server 20A, and the edge server 20B are involved in the present sequence.

First, the sensor device 30B transmits the sensing information to the edge server 20A (step S402). For example, the sensor device 30B uploads a captured image of the sensing target 300 to the edge server 20A.

Next, the edge server 20A makes a determination of change in charge on the basis of the sensing information received from the sensor device 30B (step S404). In a case where it is determined that the sensing by the sensor device 30B should be continued, the sensing by the sensor device 30B is continued as it is.

On the other hand, in a case where it is determined that the sensing by the sensor device 30B should not be continued, the edge server 20A performs the sensor device search processing for searching for the changed sensor device 30 in charge (step S406). However, in a case where an appropriate sensor device 30 is not included in the sensor devices 30 under control of the edge server 20A, the edge server 20A transmits a sensor search request to another edge server 20 (for example, the edge server 20B) having an adjacent management, range (step S408). The sensor search request can include, for example, the position information of the sensor device 30B in charge, information indicating the sensable range, and the identification information of the sensing target, and the like.

Next, the edge server 20B that has received the sensor search request performs the sensor device search processing for searching for the changed sensor device 30 in charge (step S410). For example, the edge server 20B identifies the sensor device 30 under control of the edge server 20B, the sensor device 30 being adjacent to the sensor device 30B, on the basis of the position information of the sensor device 30B. Next, the edge server 20B estimates which sensable range of a sensor device 30 among the sensor devices 30 under control of the edge server 20B the sensing target 300 will move to on the basis of the moving speed and the moving direction of the sensing target 300, thereby determining the changed sensor device 30 in charge. Here, it is assumed that the edge server 20B determines the sensor device 305 as the changed sensor device 30 in charge.

The edge server 20B that has succeeded in the search transmits a response to the sensor search request to the edge server 20A (step S412).

Next, the edge server 20A transmits the information regarding the sensing target to the edge server 201B that is the transmission source of the response to the sensor u search request (step S414). Note that the edge server 20A may transmit, to the edge server 20B, the sensing information acquired so far and data processed by the information processing, and further, information regarding the user device 40 that the sensing target 300 is involved.

Next, the edge server 20B transmits the received information regarding the sensing target to the sensor device 30C determined as the changed sensor device 30 in charge (step S416).

The sensor device 30C transmits an ACK to the edge server 20B (step S418) and starts sensing of the sensing target 300 (step S420). Here, in a case where parameter setting has been made such that the sensor device 30B follows the sensing target 300, the edge server 20A may notify the sensor device 30B of a release command to release the parameter setting (step S422).

Second Example

Figure 19:
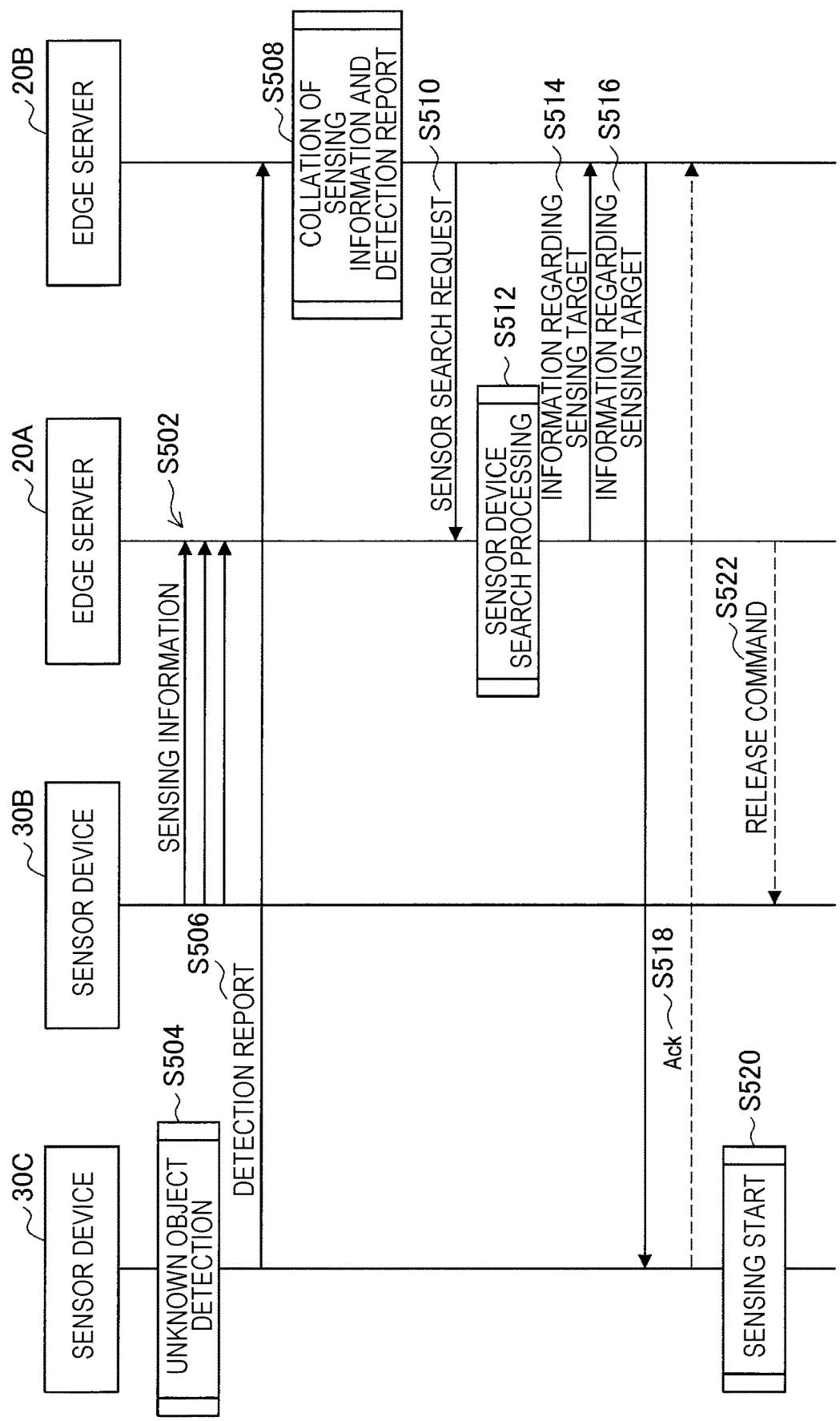
FIG. 19 is a sequence diagram illustrating an example of a flow of the service providing processing in the second scenario executed in the system according to the present embodiment.

FIG. 19 is a sequence diagram illustrating an example of a flow of the service providing processing in the second scenario executed in the system 1 according to the present embodiment. As illustrated in FIG. 19, the sensor device 30B, the sensor device 30C, the edge server 20A, and the edge server 20B are involved in the present sequence.

First, the sensor device 30B appropriately transmits the sensing information to the edge server 20A (step S502). For example, the sensor device 30B uploads the captured image of the sensing target 300 to the edge server 20A at predetermined intervals.

During the upload, it is assumed that the sensing target 300 has moved from the sensable range 31B of the sensor device 30B to the sensable range 31C of the sensor device 30C.

Then, the sensor device 30C detects the sensing target 300 as an unknown object (step S504) and transmits a detection report to the edge server 20B (step S506).

Next, the edge server 20B collates the information included in the received detection report with the sensing information held by the edge server 20B (step S508). In a case where the edge server 20B cannot specify the unknown object, the edge server 20B transmits the sensor search request for searching for the sensor device 30 in charge to another edge server 20 (for example, the edge server 20A) having an adjacent management range (step S510).

Next, the edge server 20A that has received the sensor search request performs the sensor device search processing for searching for the sensor device 30 in charge (step S512). For example, the edge server 20A specifies that the unknown object is the sensing target 300 of the sensor device 30B on the basis of the received sensor search request.

The edge server 20A that has succeeded in the specification transmits the information regarding the sensing target to the edge server 20B (step S514). Note that the edge server 20A may transmit, to the edge server 20B, the sensing information acquired so far and data processed by the information processing, and further, information regarding the user device 40 that the sensing target 300 is involved.

Next, the edge server 20B transmits the received information regarding the sensing target to the sensor device 30C (step S516).

The sensor device 30C transmits an ACK to the edge server 20B (step S518) and starts sensing of the sensing target 300 (step S520). Here, in a case where parameter setting has been made such that the sensor device 30B follows the sensing target 300, the edge server 20A may notify the sensor device 30B of a release command to release the parameter setting (step S522).

The first and second examples have been described above. By the above-described procedure, the sensing information can be continuously acquired without a delay even if the sensing target moves between the management ranges of the different edge servers 20. Thereby, the edge server 20 can continuously provide a service to the user.

<3.2.3. Third Scenario>

A third scenario is a scenario in which the user device 40 moves beyond the cell associated with the edge server 20.

Figure 20:
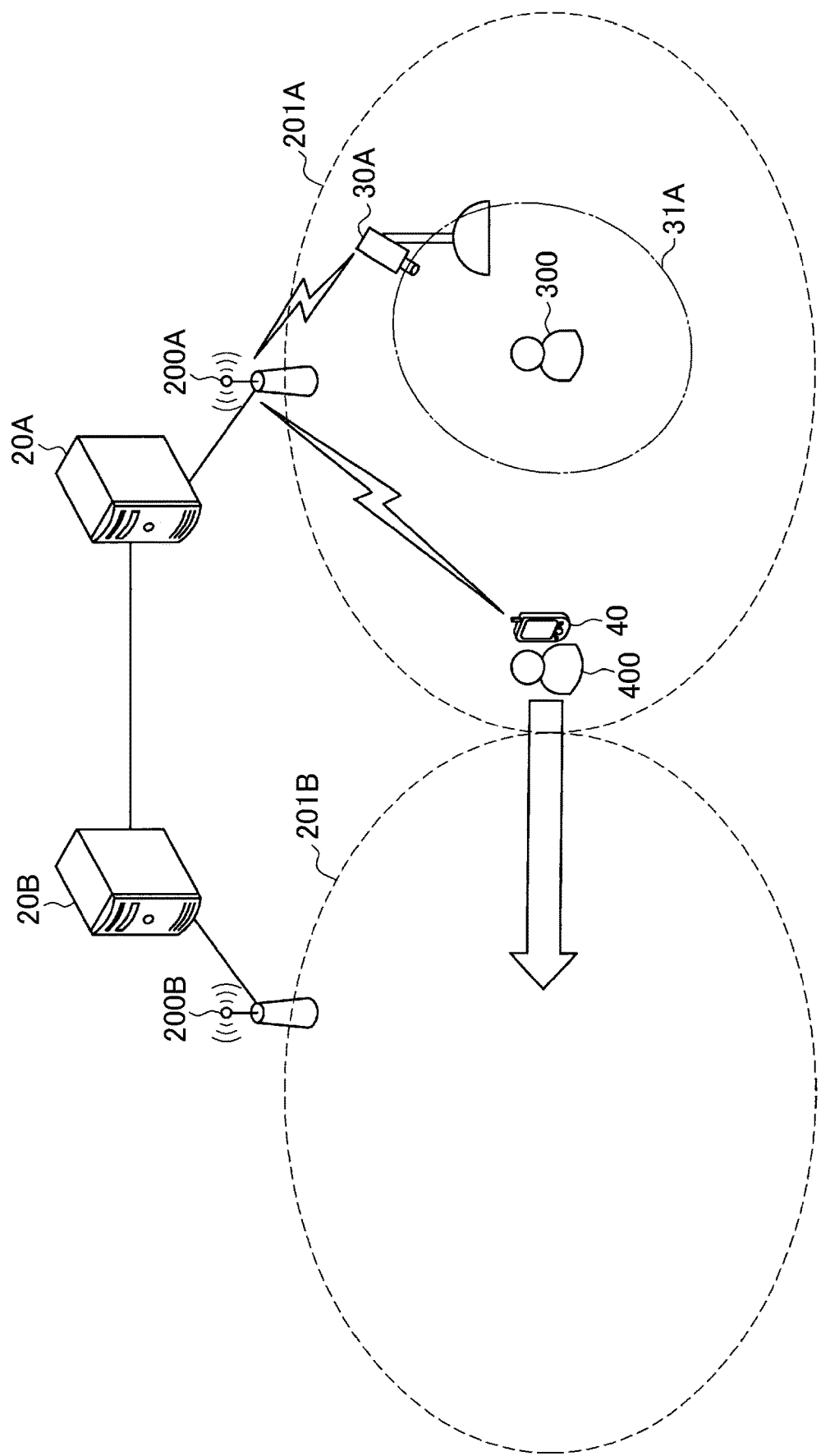
FIG. 20 is a diagram for describing an outline of a third scenario.

FIG. 20 is a diagram for describing an outline of a third scenario. In FIG. 20, a configuration involved in the description of the present scenario is extracted from the overall configuration illustrated in FIG. 1. In the example illustrated in FIG. 20, the sensing target 300 is located in the sensable range 31A of the sensor device 30A, and the user device 40 moves from the cell 201A associated with the edge server 20A to the cell 201S associated with the edge server 20B.

In a case where the user device 40 moves from the first cell associated with the edge server 20 itself to the second cell associated with another edge server 20, the edge server 20 transmits the information regarding the user device 40 to the another edge server 20. For example, the edge server 20 transmits user device information of the moving user device 40 to the another edge server 20 associated with the second cell at a moving destination. With the transmission, the edge server 20 can cause the another edge server 20 to recognize movement of the user device 40 and can hand over processing for service provision to the another edge server 20. For example, the edge server 20 transmits information regarding a service of the moving user device 40 (for example, the service subscription information, and the like), thereby causing the another edge server 20 to cause the user device 40 to continue an equivalent service.

Furthermore, in a case where the user device 40 moves from the first cell associated with the edge server 20 itself to the second cell associated with another edge server 20, the edge server 20 transmits the information regarding the another edge server 20 to the user device 40. For example, the edge server 20 transmits access information of the another edge server 20 associated with the second cell at the moving destination to the user device 40. With the transmission, the user device 40 can access the another edge server 20 after the movement to seamlessly change a provider of the service and can continuously receive provision of the service.

Hereinafter, the processing in the third scenario will be described.

Figure 21:
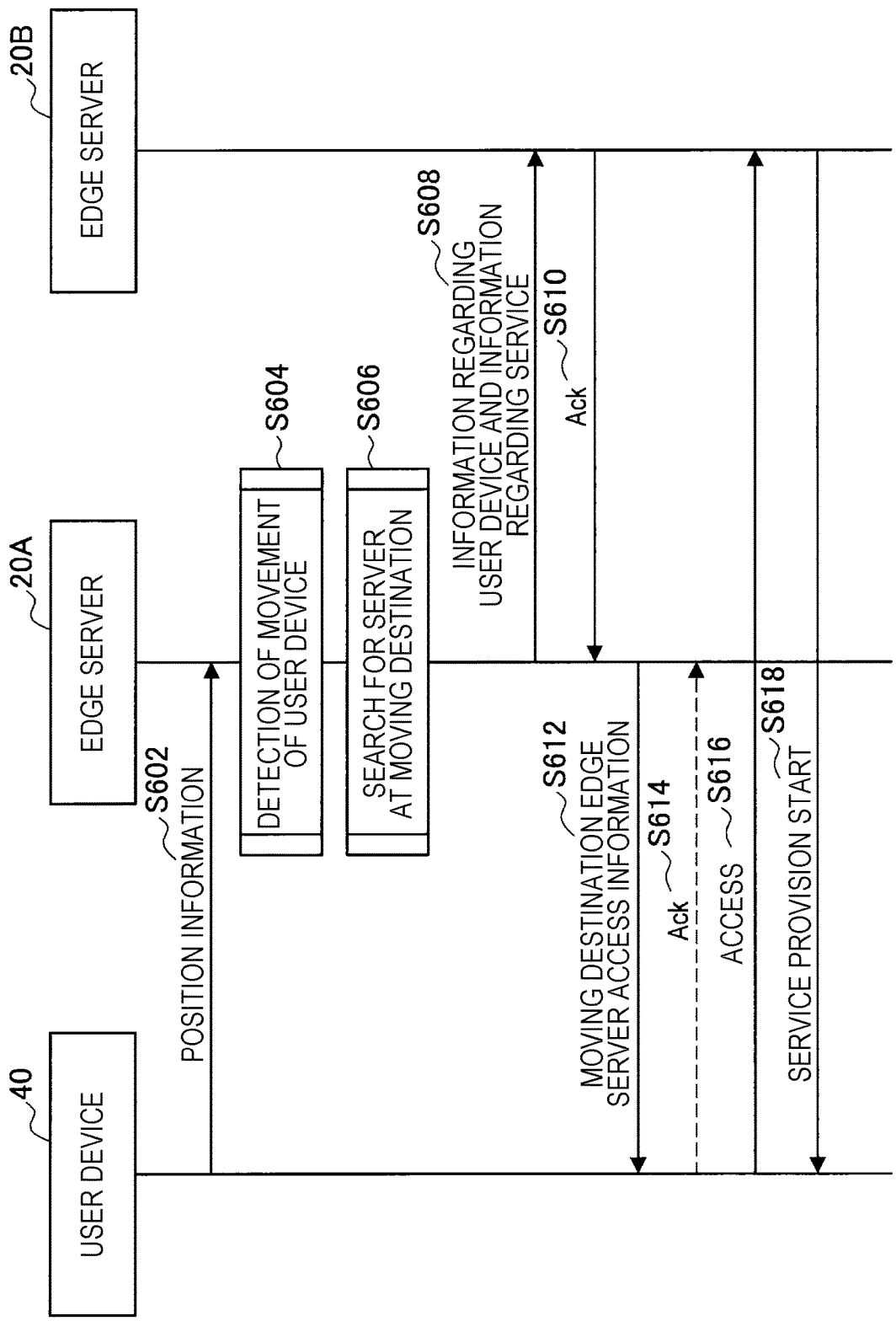
FIG. 21 is a sequence diagram illustrating an example of a flow of service providing processing in the third scenario executed in the system according to the present embodiment.

FIG. 21 is a sequence diagram illustrating an example of a flow of service providing processing in the third scenario executed in the system 1 according to the present embodiment. As illustrated in FIG. 21, the user device 40, the edge server 20A, and the edge server 20B are involved in the present sequence.

First, the user device 40 periodically or irregularly transmits the position information to the edge server 20A (step S602).

Next, the edge server 20A detects movement of the user device 40 on the basis of the received position information (step S604).

Then, in a case where the edge server 20A estimates that the user device 40 moves beyond the cell 201A, the edge server 20 searches for another edge server 20 associated with a cell at the moving destination (step S606). Here, it is assumed that the edge server 20B is searched for as the another edge server 20 associated with the cell at the moving destination.

Next, the edge server 20A transmits the information regarding the user device 40 and the information regarding the service to the edge server 20B (step S608). For example, in a case where the edge server 20A has been providing a streaming service such as moving image delivery to the user device 40, the edge server 20A transmits position information and registration information of the user device 40 and streaming data to the edge server 20B. Thereby, the edge server 20B can prepare for the provision of the streaming service to the user device 40 thereafter.

Next, the edge server 20B transmits an ACK to the edge server 20A (step S610). Next, the edge server 20A transmits the edge server access information regarding the edge server 20B at the moving destination to the user device 40 (step S612).

Next, the user device 40 transmits an ACK to the edge server 20A (step S614). Next, the user device 40 accesses the edge server 20B using the received edge server access information (step S616).

Then, the edge server 20B starts provision of the service to the user device 40 (step S618).

By the above-described procedure, even if the user device 40 moves beyond the cell, the edge server 20 can continuously provide the service to the user without a delay.

<3.2.4. Supplement>

In a case where the edge server 20 cannot make a determination regarding service provision due to reasons that the information of surrounding other edge servers 20 is insufficient, a management source of the sensor device 30 is unknown, or the like, the edge server 20 may inquire of the global server 10 about the information. A flow of processing in that case will be described with reference to FIG. 22.

Figure 22:
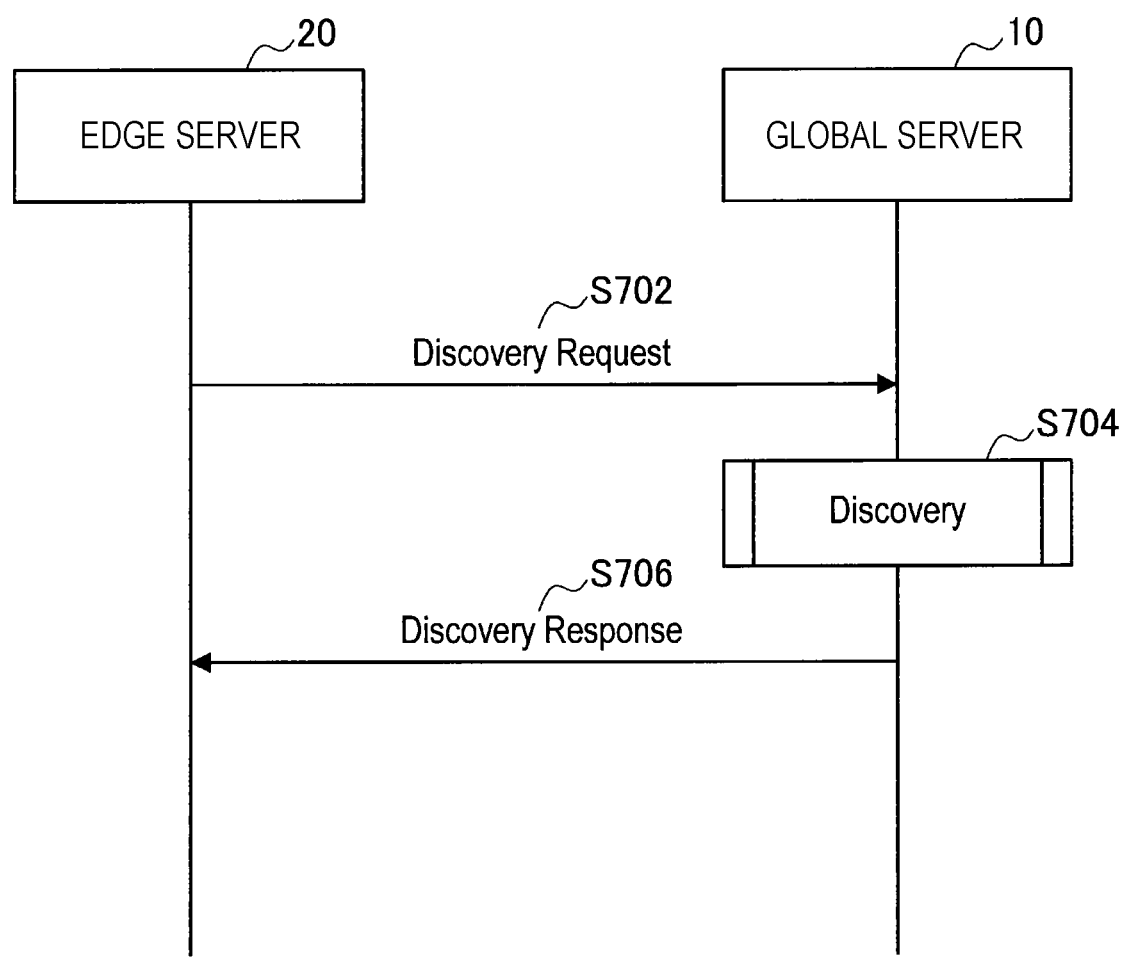
FIG. 22 is a sequence diagram illustrating an example of a flow of inquiry processing to the global server 10 executed in the system according to the present embodiment.

FIG. 22 is a sequence diagram illustrating an example of a flow of inquiry processing to the global server 10 executed in the system 1 according to the present embodiment. As illustrated in FIG. 22, the edge server 20 and the global server 10 are involved in the present sequence.

First, the edge server 20 transmits a discovery request to the global server 10 (step S702).

Next, the global server 10 performs discovery processing to obtain information regarding other edge servers 20 on the basis of the received discovery request (step S704).

Then, the global server 10 transmits a discovery response including a result of the discovery processing to the edge server 20 (step S706).

4. REFERENCE MODEL IMPLEMENTATION EXAMPLE

A reference mode of the functional configuration of the system 1 illustrated in FIG. 8 can be implemented in various ways. Hereinafter, another implementation example of the reference model will be described with reference to FIGS. 23 and 24.

(1) Distributed Processing of Sensing Information

Figure 23:
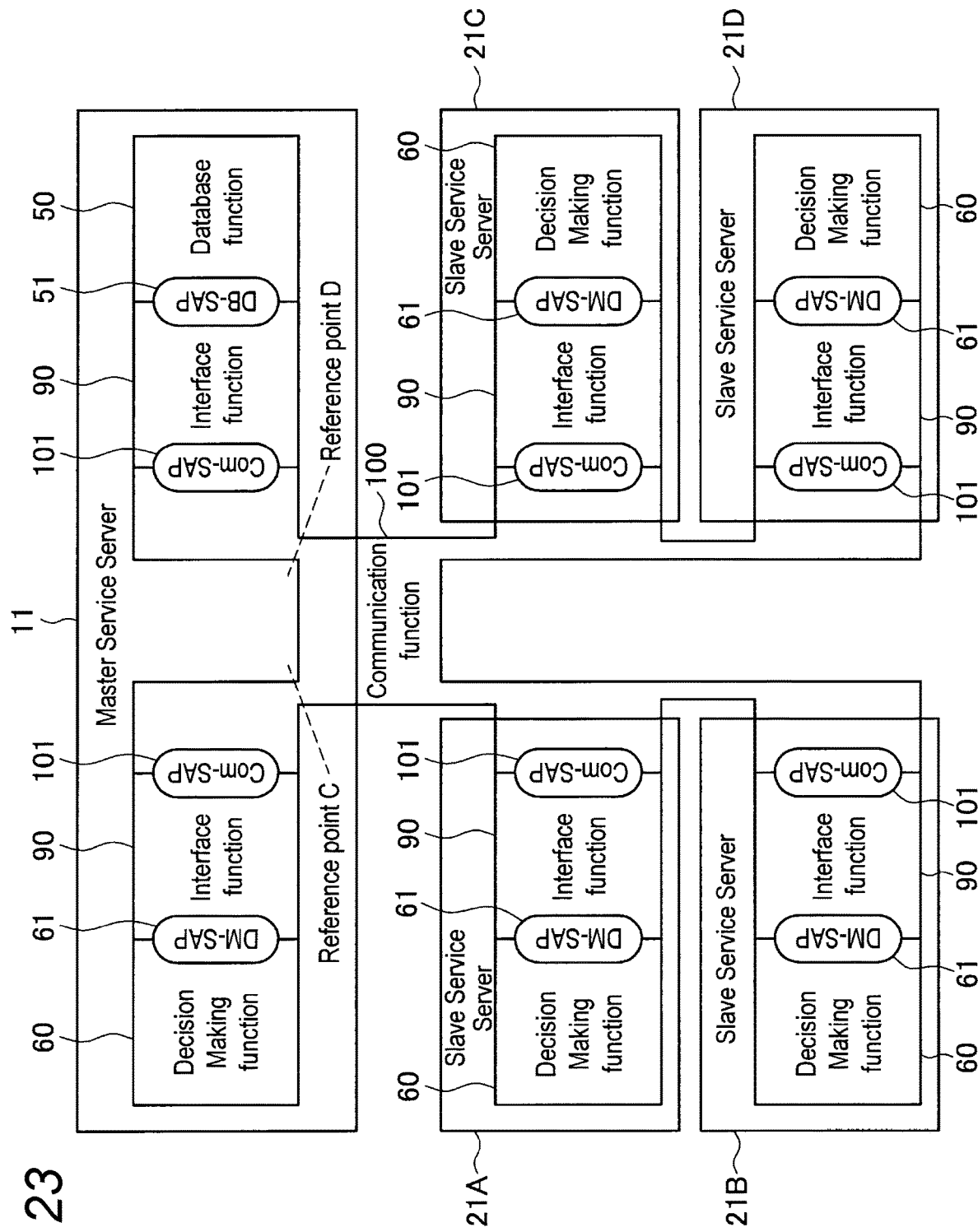
FIG. 23 is a diagram for describing another implementation example of a reference model according to the present embodiment.

FIG. 23 is a diagram for describing another implementation example of a reference model according to the present embodiment. The implementation example illustrated in FIG. 23 is a configuration in which a master service server 11 of central control type controls slave service servers 21 (21A to 21D) for processing the sensing information in a distributed manner. The decision making function 60 and the interface function 90 are mapped to each slave service server 21. The decision making function 60, the interface function 90 corresponding to the decision making function 60, the database function 50, and the interface function 90 corresponding to the database function 50 are mapped to the master service server 11. Then, the communication function 100 is mapped to the reference points C and D between the master service server 11 and each slave service server 21.

The slave service servers 21 can be connected to one or more sensor devices 30 via the reference point B and may be connected to one or more user devices 40 via the reference point A.

The master service server 11 delegates information processing for providing a sensing service to the slave service servers 21. Then, the master service server 11 bundles and processes processing results by the slave service servers 21 to provide the service. Such distributed processing realizes distribution of computing load.

Furthermore, the master service server 11 manages mobility of the user device 40 and the sensing target. As a result, overhead of information exchange between the slave service servers 21 can be reduced and high efficiency can be realized.

As described above, the configuration capable of processing the sensing information in a distributed manner can realize calculation load distribution of servers and efficient information exchange between servers.

(2) Collection and Processing of Big Data

Figure 24:
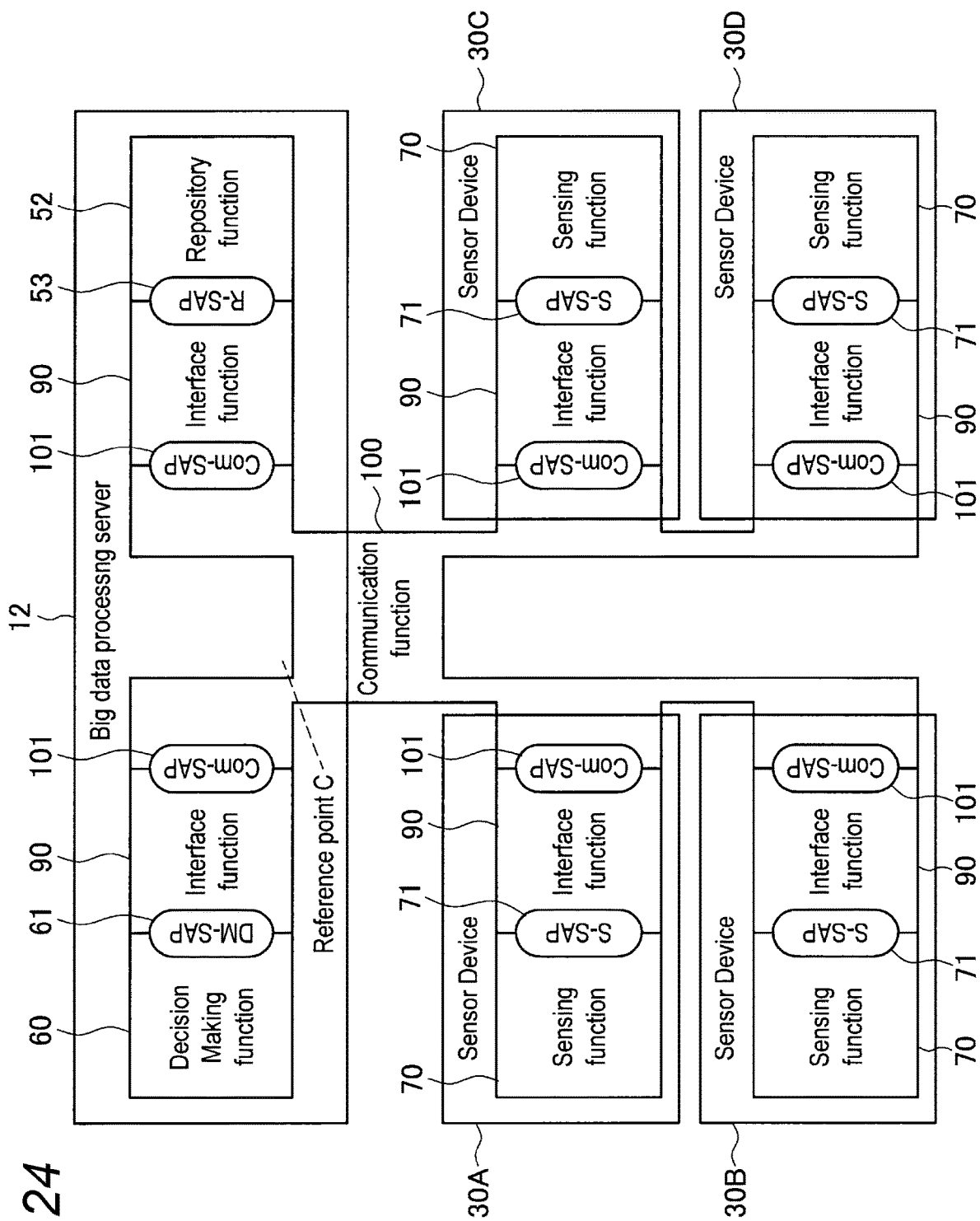
FIG. 24 is a diagram for describing another in example of a reference model according to the present embodiment.

FIG. 24 is a diagram for describing another implementation example of a reference model according to the present embodiment. The implementation example illustrated in FIG. 24 is a configuration in which a big data processing server 12 performs big data processing for the sensing information acquired from the plurality of sensor devices 30 (30A to 30D). The decision making function 60, the interface function 90 corresponding to the decision making function 60, a repository function 52, and the interface function 90 corresponding to the repository function are mapped to the big data processing server 12.

The repository function 52 is a software or hardware module that stores information for the big data processing. A service access point of the repository function 52 is Repository (R)-SAP 53. The decision making function 60 of the big data processing server 12 applies the big data processing to the sensing information stored in the repository function 52 so that the sensing information can be provided as a service to the user.

The big data processing server 12 is connected to one or more sensor devices 30 via the reference point C. Furthermore, the user device 40 can access the big data processing server 12 via the reference point A and receive provision of the service.

Even in such an implementation form, the above-described present technology is applicable. For example, in a case where the sensing target moves beyond the sensable range or the management range of the sensor device 30, the big data processing server 12 can efficiently and appropriately provide a service using the big data processing to the user, similarly to the first scenario and the second scenario.

Furthermore, in a case where the user device 40 moves beyond the cell, the big data processing server 12 can efficiently and appropriately provide a service using the big data processing to the user, similarly to the third scenario.

5. APPLICATION EXAMPLE

Hereinafter, an example of an application provided by the above-described system 1 will be described.

5.1. First Application Example

Figure 25:
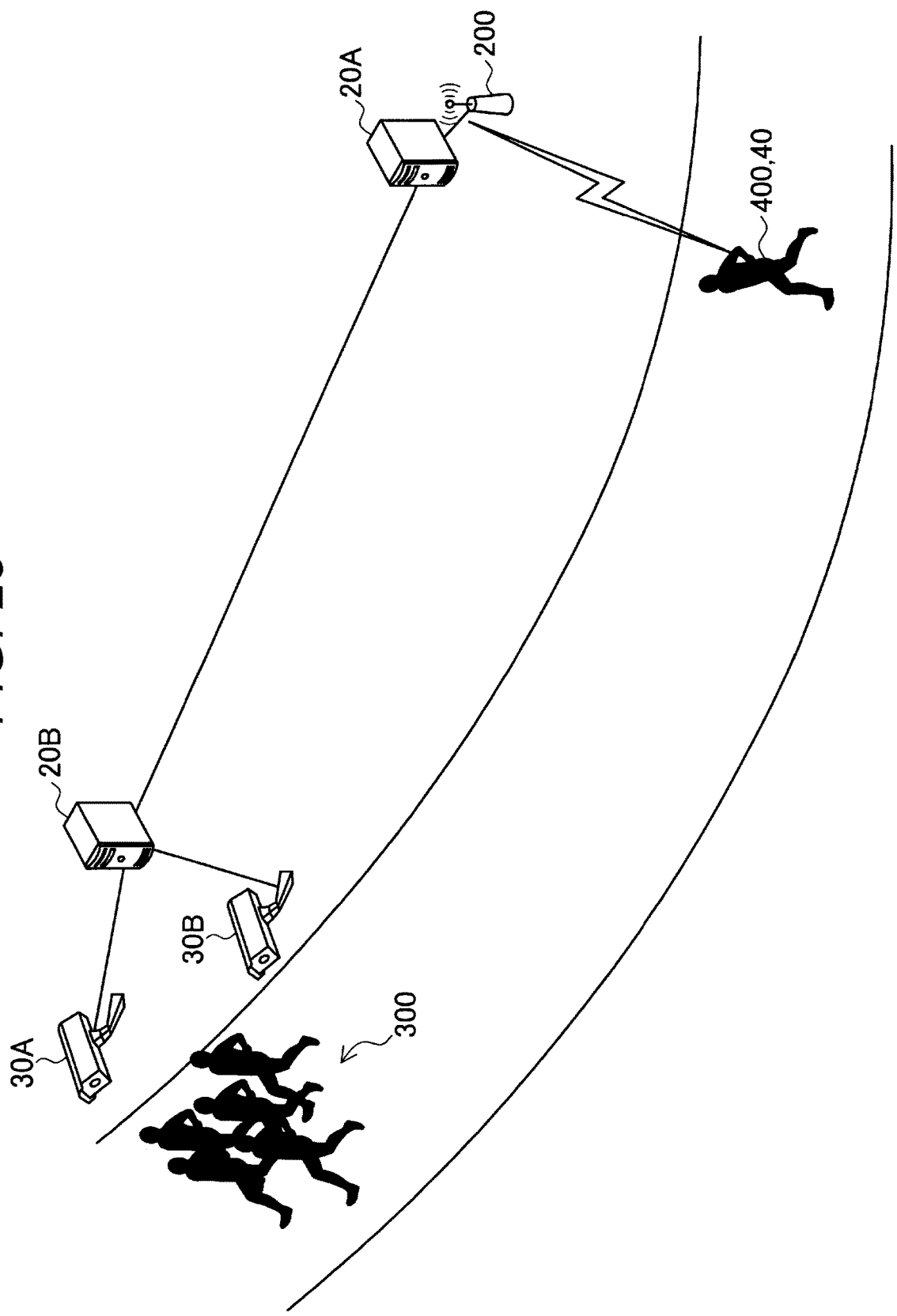
FIG. 25 is a diagram for describing a first application example provided by the system according to the present embodiment.

FIG. 25 is a diagram for describing a first application example provided by the system 1 according to the present embodiment. As illustrated in FIG. 25, the first application example relates to marathon. The user 400 is a runner of the marathon, and the user device 40 is a device of the runner, such as a wearable device. The sensing target 300 is another runner preceding the user 400. The sensor devices 30A and 30S are environment sensing cameras installed along a marathon course. For example, the user 400 receives provision of a sensing service regarding the sensing target 300 and receives provision of a service instructing optimal pace distribution according to a course situation or the like. Hereinafter, provision of the services by the present application will be described in detail.

First, the user 400 performs subscription to receive provision of the services provided by the present application. Specifically, the user 400 notifies the edge server 20 of the subscription request via the user device 40 before starting. A procedure of this notification may be started by the sound recognition, an input with a physical key, or the like, as a trigger. The subscription request may include, for example, the position information of the user device 40, information regarding physical conditions of the user 400 detected by the user device 40 (for example, a body temperature, a pulse rate, and the like). Furthermore, in a case where a camera is attached to the user device 40, the subscription request can include image information including information that can identify the appearance of the user 400, such as a face image or a full-body image of the user 400. This image information may be used as auxiliary information for identification of the user 400 by image recognition for continuously tracking the user 400 across the edge server 20.

While running, the user 400 notifies the edge server 20A of the service provision request via the user device 40. Similarly to the subscription request, a procedure of this notification may be started by the sound recognition, an input with a physical key, or the like, as a trigger. For example, in the service provision request, a case is assumed in which the user 400 seeks provision of information for optimal running based on current information (for example, the speed) of the sensing target 300 that the user 400 wants to use as a pacemaker and current information of the user 400. Therefore, for example, the service provision request can include characteristic information (for example, a runner name, an event registration number, and the like) of the sensing target 300, or information of separation distance from the user 400 (in other words, information that the user 400 wants to have a runner of x [m] ahead as a pacemaker). The edge server 20A acquires the sensing information from the sensor device 30A and the sensor device 30B via the edge server 20B on the basis of the information, and processes the acquired sensing information and the information obtained from the user 400, thereby providing the sensing service.

The first application example has been described above. Note that, in the present application, both the user and the sensing target are runners and involve geographical and spatial movement. Therefore, by application of the above-described present technology, the present application can continuously provide a service to the user without a delay.

5.2. Second Application Example

Figure 26:
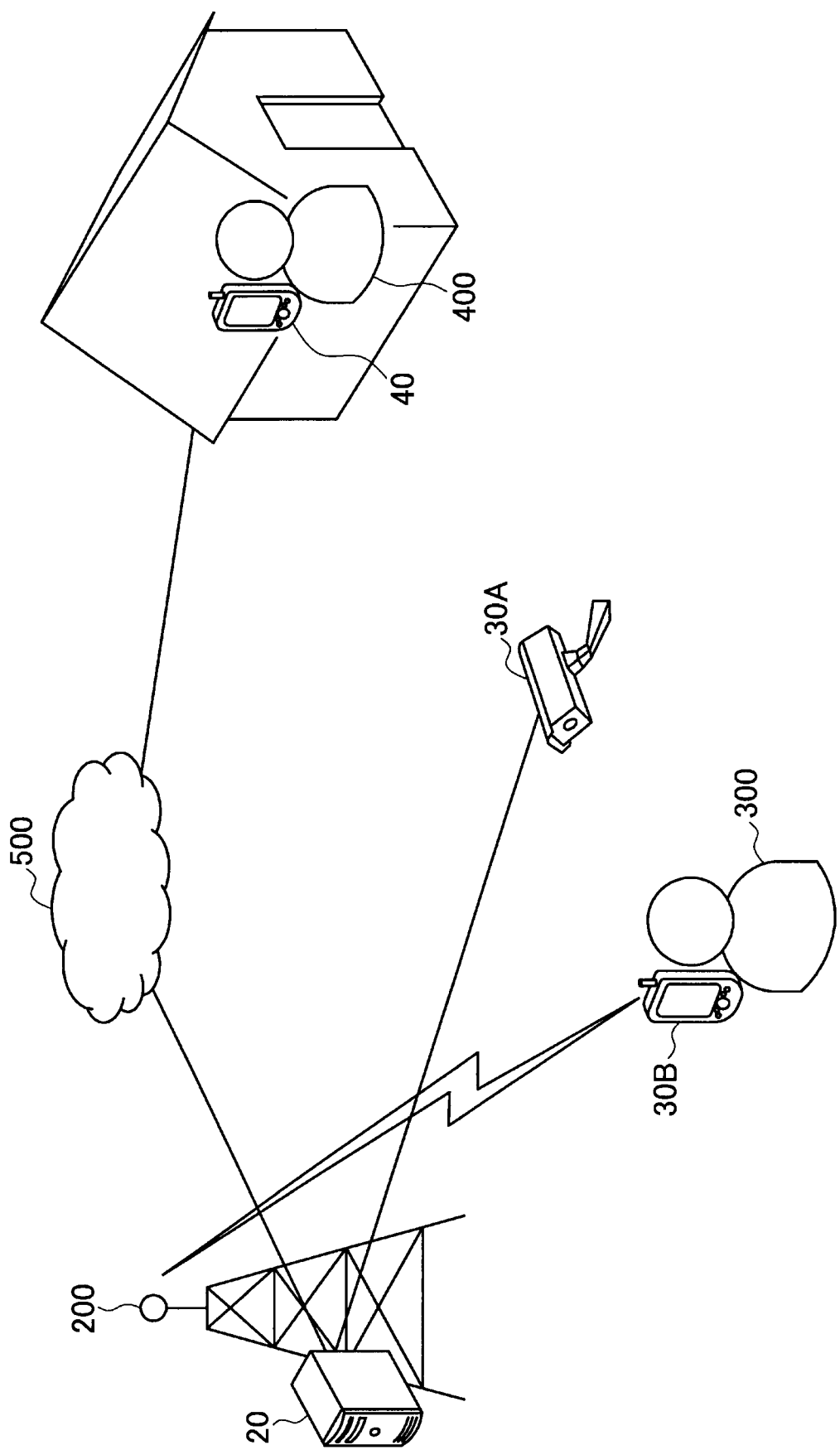
FIG. 26 is a diagram for describing a second application example provided by the system according to the present embodiment.

FIG. 26 is a diagram for describing a second application example provided by the system 1 according to the present embodiment. As illustrated in FIG. 26, the second application example relates to watching. The user 400 is a guardian or a caregiver, and the user device 40 is a device such as a smartphone of the guardian or the caregiver. The sensing target 300 is a person to be watched by the guardian or the caregiver, such as an elderly person or a child. As the sensor device 30, for example, a heat detection sensor (especially for detecting a body temperature of an elderly person), a smart phone (for detecting a position by GPS), a monitoring camera (for acquiring a video and an image), and the like can be considered. In the example illustrated in FIG. 26, the sensor device 30A is a monitoring camera and the sensor device 30B is a smartphone used by the sensing target 300.

The present application is intended to protect children from crimes such as abduction or to protect elder people with dementia having pyromania, for example, and delivers a video or the like in real time. By application of the above-described present technology to the present application, the guardian or the caregiver can watch the person to be watched from a remote place regardless of where the person to be watched is. Hereinafter, provision of a service by the present application will be described in detail.

First, the user 400 performs subscription to receive provision of the service provided by the present application. Specifically, the user 400 notifies the edge server 20 of the subscription request via the user device 40. A procedure of this notification may be started by the sound recognition, an input with a physical key, or the like, as a trigger. The subscription request can include, for example, a phone number, an email address, the position information, and the like of the user device 40. Furthermore, the subscription request can include information regarding health conditions (for example, a body temperature, a pulse rate, and the like) of the sensing target 300 and the like. Furthermore, the subscription request can include image information including information that can identify the appearance of the sensing target 300, such as a face image or a full-body image of the user 400. This image information may be used as auxiliary information for identification of the sensing target 300 by image recognition for continuously tracking the sensing target 300 across the edge server 20. The subscription request may be given in notification via an application of a smartphone or a PC or a GUI such as a web browser.

Furthermore, information regarding a smartphone 30B owned by the sensing target 300 may be registered in the subscription. For example, a phone number and owner information of the smartphone 309 can be registered.

After performing the subscription, the user 400 notifies the edge server 20 of the service provision request via the user device 40. Similarly to the subscription request, a procedure of this notification may be started by the sound recognition, an input with a physical key, or the like, as a trigger. Furthermore, this notification may also be performed via an application of a smartphone or a PC or a GUI such as a web browser, similarly to the subscription request.

Figure 27:
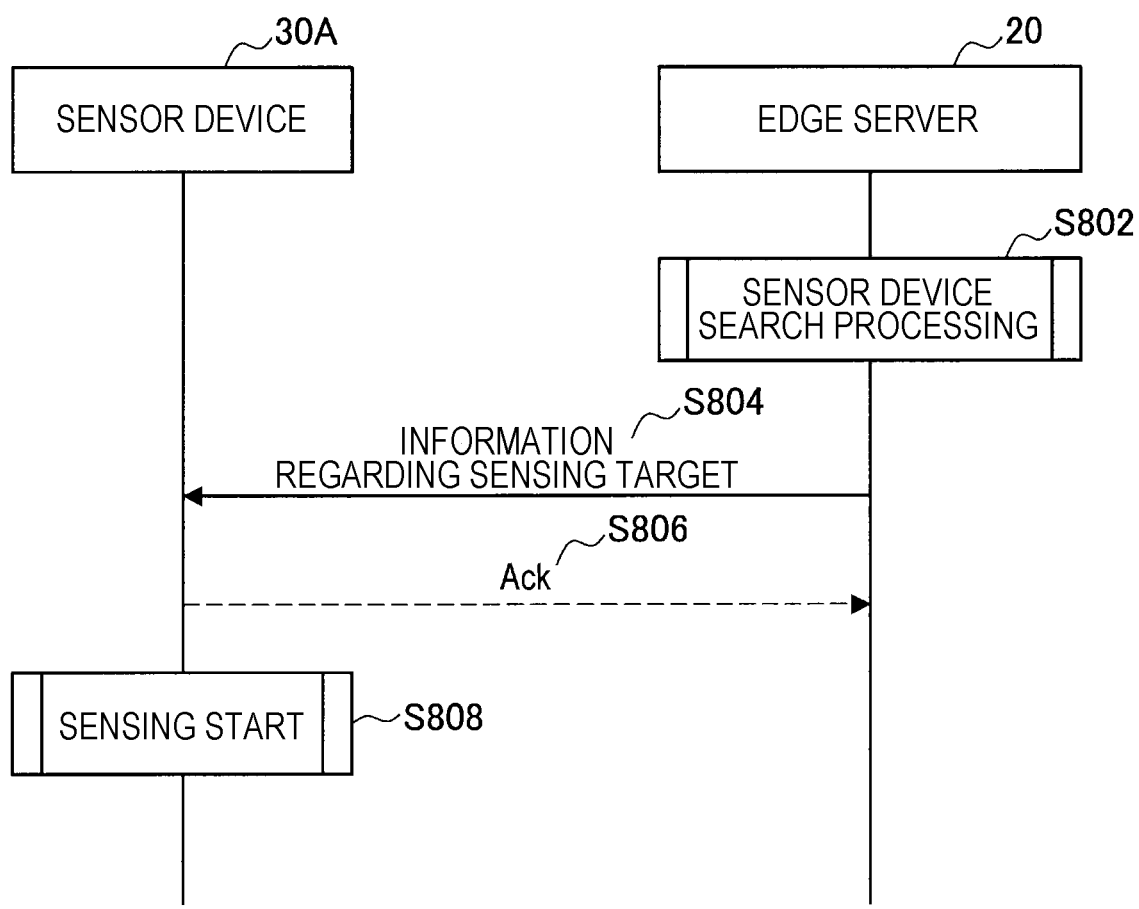
FIG. 27 is a sequence diagram illustrating as example of a flow of service providing processing in the second application example provided by the system according to the present embodiment.

Processing at the start of a service will be described with reference to FIG. 27. FIG. 27 is a sequence diagram illustrating an example of a flow of service providing processing in the second application example provided by the system 1 according to the present embodiment. As illustrated in FIG. 27, the sensor device 30A and the edge server 20 are involved in the present sequence.

First, the edge server 20 performs the sensor device search processing for searching for the sensor device 30 capable of sensing the sensing target 300 (step S802). For example, the edge server 20 searches for the sensing target 300 on the basis of subscription information, information included in the service provision request, and the sensing information provided by the sensor device 30. Here, as a result of analysis, it is assumed that the sensor device 30A captures the sensing target 300.

Next, the edge server 20 transmits the information regarding the sensing target to the sensor device 30A (step S804). At that time, the edge server 20 may also provide notification of information regarding the analysis result.

Then, the sensor device 30A starts sensing (step S806). At that time, the sensor device 30A may perform setting for sensing on the basis of the information received from the edge server 20, for example.

The second application example has been described above. Note that, in the present application, both the user and the sensing target involve geographical and spatial movement. Therefore, by application of the above-described present technology, the present application can continuously provide a service to the user without a delay.

5.3. Third Application Example

A third application example relates to tracking offenders. In the present application example, the user is a store clerk at a convenience store or a police officer, the user device 40 is a device of the store or a police, the sensor device 30 is a monitoring camera, and the sensing target is a customer who has left the store, for example.

For example, assuming that a crime such as shoplifting occurs in the convenience store, and an offender (in other words, the customer) escapes. In such a case, the clerk enters characteristics of the offender, store information, and the like on the PC provided in the store to notify the edge server 20 of the information. At this time, notification to the police may be automatically performed.

The edge server 20 handles the information given in notification as the service provision request. The edge server 20 simultaneously transmits the sensing request to the sensor devices 30 around the store to acquire the sensing information. Then, the edge server 20 searches for the offender on the basis of the acquired sensing information and the information included in the service provision request, and transmits the sensing request to the sensor device 30 capable of capturing the offender.

Thereafter, the system 1 continuously tracks the offender without a delay while switching the edge server 20 of the processing main constituent and the sensor device 30 which performs sensing with the movement of the offender. Thereby, the system 1 can contribute to arrest of the offender by the police.

The third application example has been described above. Note that, in the present application, both the user and the sensing target involve geographical and spatial movement. Therefore, by application of the above-described present technology, the present application can continuously provide a service to the user without a delay.

6. HARDWARE CONFIGURATION EXAMPLE

Figure 28:
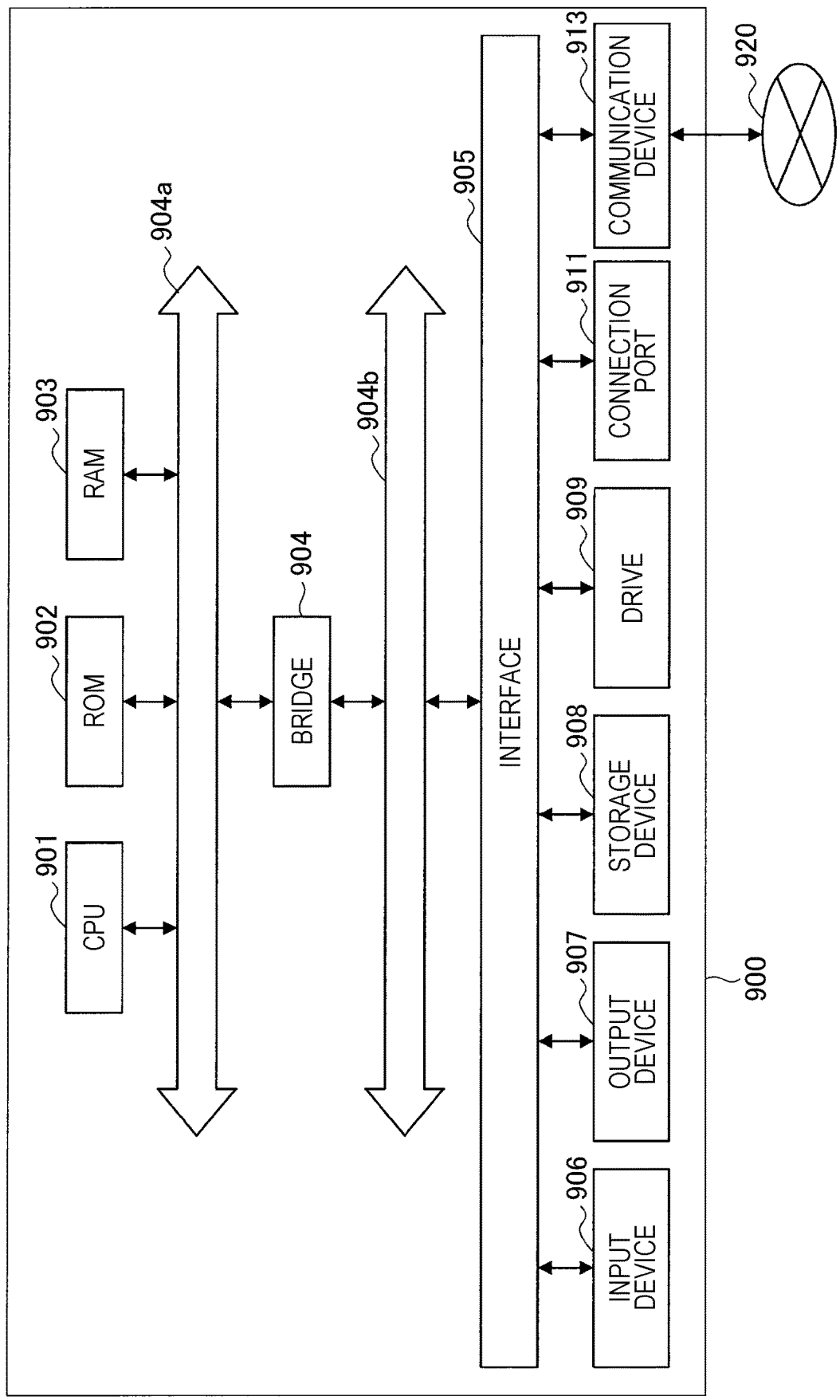
FIG. 28 is a block diagram illustrating an example of a hardware configuration of an information processing apparatus according to the present embodiment.

Finally, a hardware configuration of an information processing apparatus according to the present embodiment will be described with reference to FIG. 28. FIG. 28 is a block diagram illustrating an example of a hardware configuration of an information processing apparatus according to the present embodiment. Note that an information processing apparatus 900 illustrated in FIG. 28 can realize, for example, the global server 10, the edge server 20, the sensor device 30, or the user device 40 illustrated in FIGS. 4, 5, 6, and 7. Information processing by the global server 10, the edge server 20, the sensor device 30, or the user device 40 according to the present embodiment is realized by cooperation of software with hardware described below.

As illustrated in FIG. 28, the information processing apparatus 900 includes a central processing unit (CPU) 901, a read only memory (ROM) 902, a random access memory (RAM) 903, and a host bus 904a. Furthermore, the information processing apparatus 900 includes a bridge 904, an external bus 904b, an interface 905, an input device 906, an output device 907, a storage device 908, a drive 909, a connection port 911, and a communication device 913. The information processing apparatus 900 may include a processing circuit such as an electric circuit, a DSP, or an ASIC, in place of or in addition to the CPU 901.

The CPU 901 functions as an arithmetic processing device and a control device, and controls the overall operation in the information processing apparatus 900 according to various programs. Furthermore, the CPU 901 may be a microprocessor. The ROM 902 stores programs, operation parameters, and the like used by the CPU 901. The RAM 903 temporarily stores programs used in the execution of the CPU 901, parameters that appropriately change in the execution, and the like. The CPU 901 can form, for example, the control unit 130 illustrated in FIG. 4, the control unit 230 illustrated in FIG. 5, the control unit 350 illustrated in FIG. 6, or the control unit 460 illustrated in FIG. 7.

The CPU 901, the ROM 902, and the RAM 903 are mutually connected by the host bus 904a including a CPU bus and the like. The host bus 904a is connected to the external bus 904b such as a peripheral component interconnect/interface (PCI) bus via the bridge 904. Note that the host bus 904a, the bridge 904, and the external bus 904b are not necessarily separately configured, and these functions may be implemented on one bus.

The input device 906 is realized by, for example, a device to which information is input by the user, such as a mouse, a keyboard, a touch panel, a button, a microphone, a switch, and a lever. Furthermore, the input device 906 may be, for example, a remote control device using infrared rays or other radio waves or an externally connected device such as a mobile phone or a PDA corresponding to the operation of the information processing apparatus 900. Moreover, the input device 906 may include, for example, an input control circuit that generates an input signal on the basis of the information input by the user using the above input means and outputs the input signal to the CPU 901, and the like. The user of the information processing apparatus 900 can input various data and give an instruction of processing operations to the information processing apparatus 900 by operating the input device 906.

Besides, the input device 906 can be formed by a device that detects information regarding the user. For example, the input device 906 can include various sensors such as an image sensor (for example, a camera), a depth sensor (for example, a stereo camera), an acceleration sensor, a gyro sensor, a geomagnetic sensor, an optical sensor, a sound sensor, a distance sensor, and a force sensor. Furthermore, the input device 906 may acquire an attitude, a moving speed, or the like of the information processing apparatus 900, information regarding a state of the information processing apparatus 900 itself, or information regarding an environment around the information processing apparatus 900 such as brightness, noise, or the like around the information processing apparatus 900. Furthermore, the input device 906 may include a global navigation satellite system (GNSS) module that receives the GNSS signal from the GNSS satellite (for example, a global positioning system (GPS) signal from a GPS satellite) and measures position information including the latitude, longitude, and altitude of the apparatus. Furthermore, regarding the position information, the input device 906 may detect the position by transmission and reception with Wi-Fi (registered trademark), a mobile phone, a PHS, a smart phone, or the like, or near field communication, or the like. The input device 906 can form, for example, the sensor unit 330 illustrated in FIG. 6 or the input unit 430 illustrated in FIG. 7.

The output device 907 is configured b a device that can visually or audibly notify the user of acquired information. Examples of such devices include display devices such as a CRT display device, a liquid crystal display device, a plasma display device, an EL display device, a laser projector, an LED projector, and a lamp, sound output devices such as a speaker and a headphone, a printer device, and the like. The output device 907 outputs, for example, results obtained by various types of processing performed by the information processing apparatus 900. Specifically, the display device visually displays the results obtained by the various types of processing performed by the information processing apparatus 900 in various formats such as text, images, tables, and graphs. Meanwhile, the sound output device converts an audio signal including reproduced sound data, voice data, or the like into an analog signal and aurally outputs the analog signal. The output device 907 can form, for example, the output unit 440 illustrated in FIG. 7.

The storage device 908 is a device for data storage formed as an example of a storage unit of the information processing apparatus 900. The storage device 908 is realized by, for example, a magnetic storage unit device such as an HDD, a semiconductor storage device, an optical storage device, a magneto-optical storage device, or the like. The storage device 908 may include a storage medium, a recording device that records data in the storage medium, a reading device that reads data from the storage medium, a deletion device that deletes data recorded in the storage medium, and the like. The storage device 908 stores programs and various data executed by the CPU 901, and various data acquired from the outside, and the like. The storage device 908 can form, for example, the storage unit 120 illustrated in FIG. 4, the storage unit 220 illustrated in FIG. 5, the storage unit 340 illustrated in. FIG. 6, or the storage unit 450 illustrated in FIG. 7.

The drive 909 is a reader/writer for storage medium, and is built in or externally attached to the information processing apparatus 900. The drive 909 reads out information recorded in a removable storage medium such as a mounted magnetic disk, optical disk, magneto-optical disk, or semiconductor memory, and outputs the information to the RAM 903. Furthermore, the drive 909 can also write information to the removable storage medium.

The connection port 911 is an interface connected to an external device, and is a connection port to an external device capable of data transmission with a universal serial bus (USB) or the like, for example.

The communication device 913 is, for example, a communication interface configured by a communication device or the like for being connected to a network 920. The communication device 913 is, for example, a communication card for wired or wireless local area network (LAN), long term evolution (LTE), Bluetooth (registered trademark), wireless USB (WUSB), or be like. Furthermore, the communication device 913 may be a router for optical-communication, a router for an asymmetric digital subscriber line (ADSL), a modem for various communications, or the like. The communication device 913 can transmit and receive signals and the like to and from the Internet and other communication devices in accordance with a predetermined protocol such as TCP/IP, for example. The communication device 913 includes, for example, the network communication unit 110 illustrated in FIG. 4, the network communication unit 210 illustrated in FIG. 5, the antenna unit 310 and the wireless communication unit 320 illustrated in FIG. 6, or the antenna unit 410 and the wireless communication unit 420 illustrated in FIG. 7.

Note that the network 920 is a wired or wireless transmission path of information transmitted from a device connected to the network 920. For example, the network 920 may include a public network such as the Internet, a telephone network, and a satellite network, various local area networks including Ethernet (registered trademark), a wide area network (WAN), and the like. Furthermore, the network 920 may include a leased line network such as an internet protocol-virtual private network (IP-VPN).

In the above, an example of the hardware configuration that can realize the functions of the information processing apparatus 900 according to the present embodiment has been described. Each of the above-described constituent elements may be realized using general-purpose members or may be realized by hardware specialized for the function of each constituent element. Therefore, the hardware configuration to be used can be changed as appropriate according to the technical level of the time of carrying out the present embodiment.

Note that a computer program for realizing the functions of the information processing apparatus 900 according to the above-described present embodiment can be prepared and mounted on a PC or the like. Furthermore, a computer-readable recording medium in which such a computer program is stored can be provided. The recording medium is, for example, a magnetic disk, an optical disk, a magneto-optical disk, a flash memory, or the like. Furthermore, the above computer program may be delivered via, for example, a network without using a recording medium.

7. CONCLUSION

Hereinabove, an embodiment of the present disclosure has been described in detail with reference to FIGS. 1 to 28. As described above, the edge server 20 is arranged on a local network side with respect to a gateway between the internet and a local network, and transmits or receives the information regarding one or more sensor devices 30 wirelessly connected to the first cell associated with the edge server 20 to or from another edge server 20 associated with the second cell. Since the edge server 20 is arranged on the local network side, the communication distance from the sensor device 30 becomes short, and the load regarding the communication can be suppressed. Furthermore, since the information regarding the sensor device 30 is exchanged between the edge servers 20, the information processing based on the information regarding the sensor device 30 can be performed by the plurality of edge servers 20 in a distributed manner. In this manner, the edge server 20 can efficiently and appropriately provide a service to the user in cooperation with other edge servers 20 while accommodating a large number of sensor devices 30.

Although the favorable embodiments of the present disclosure have been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and the modifications and alterations are naturally understood to belong to the technical scope of the present disclosure.

For example, in the above embodiment, a fixedly installed device such as the surveillance camera has been described as an example of the sensor device 30, but the present technology is not limited to such an example. For example, the sensor device 30 may have mobility. In that case, processing based on movement of the sensor device 30 can be similarly performed to the above-described third scenario.

Furthermore, the processing described using the sequence diagrams in the present specification may not necessarily be executed in the illustrated order. Some processing steps may be executed in parallel. Furthermore, additional processing steps may be employed and some processing steps may be omitted.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that the following configuration also belong to the technical scope of the present disclosure.

(1)

The control device arranged on a local network side with respect to a gateway between an internet and a local network, the control device including:

a control unit configured to transmit or receive information regarding one or more sensor devices wirelessly connected to a first cell associated with the control device to or from another control device associated with a second cell.

(2)

The control device according to (1), in which the control unit selects a first sensor device capable of sensing a sensing target on the basis of a request from a terminal device, generates service information on the basis of sensing information of the selected first sensor device, and provides the service information to the terminal device.

(3) The control device according to (2), in which the request includes authentication information and contract information regarding generation of the service information.

(4)

The control device according to (2) or (3), in which the request includes information giving an instruction of the service information to be generated.

(5)

The control device according to any one of (2) to (4), in which the request includes information for identifying the sensing target.

(6) The control device according to any one of (2) to (5), in which, in a case where the sensing target moves from a sensable range of the first sensor device to a sensable range of a second sensor device, the control unit transmits information regarding the sensing target to the second sensor device.

(7)

The control device according to (6), in which the control unit transmits the information regarding the sensing target to the another control device in a case where the second sensor device is connected to the second cell.

(8)

The control device according to (7), in which the control unit transmits the information regarding the sensing target to the another control device after the control unit specifies that the sensing target has moved to the sensable range of the second sensor device.

(9)

The control device according to (7) or (8), in which, in a case where the control unit recognizes movement of the sensing target on the basis of the sensing information of the first sensor device, the control unit transmits a request for searching for the second sensor device to the another control device.

(10)

The control device according to (7) or (8), in which, in a case where the control unit recognizes movement or the sensing target on the basis of sensing information of the second sensor device, the control unit receives a request for searching for the first sensor device from the another control device.

(11)

The control device according to any one of (2) to (10), in which the control unit transmits information regarding the terminal device to the another control device in a case where the terminal device moves from the first cell to the second cell.

(12)

The control device according to any one of (2) to (11), in which the control unit transmits information regarding the another control device to the terminal device in a case where the terminal device moves from the first cell to the second cell.

(13)

The control device according to any one of (2) to (12), in which the control unit receives position information of the terminal device from the terminal device and transmits sensing information to the terminal device.

(14)

The control device according to any one of (2) to (13), in which the control unit receives position information or the sensing information of the sensor device from the sensor device.

(15)

The control device according to any one of (2) to (14), in which the control unit transmits or receives position information of the terminal device, or position information or the sensing information of the sensor device to or from the another control device.

(16)

The control device according to any one of (2) to (15), in which the terminal device is a device of a runner, and the sensing target is another runner preceding the runner.

(17)

The control device according to any one of (2) to (15), in which the terminal device is a device of a guardian or a caregiver, and the sensing target is a person to be watched of the guardian or the caregiver,

(18) The control device according to any one of (2) to (15), in which the terminal device is a device of a store or a police, and the sensing target is a customer who has left the store,

(19) A method executed by a control device arranged on a local network side with respect to a gateway between an internet and a local network, the method including:
transmitting or receiving information regarding one or more sensor devices wirelessly connected to a first cell associated with the control device to or from another control device associated with a second cell.

REFERENCE SIGNS LIST

1 System
10 Global server
11 Master service server
12 Big data processing server
20 Edge server
21 Slave service server
30 Sensor device
31 Sensable range
40 User device
200 Access point
201 Cell
300 Sensing target
400 User
500 Internet
600 Service provision server

The invention claimed is:

1. A control device arranged on a local network side with respect to a gateway between an internet and a local network, the control device comprising:
a control unit configured to transmit or receive information regarding one or more sensor devices wirelessly connected to a first cell associated with the control device to or from another control device associated with a second cell,
wherein the control unit selects a first sensor device capable of sensing a sensing target on a basis of a request from a terminal device, generates service information on a basis of sensing information of the selected first sensor device, and provides the service information to the terminal device,
wherein, in a case where the sensing target moves from a sensable range of the first sensor device to a sensable range of a second sensor device, the control unit transmits information regarding the sensing target to the second sensor device,
wherein the control unit transmits the information regarding the sensing target to the another control device in a case where the second sensor device is connected to the second cell, and
wherein the control unit is implemented via at least one processor.

2. The control device according to claim 1, wherein the request includes authentication information and contract information regarding generation of the service information.

3. The control device according to claim 1, wherein the request includes information giving an instruction of the service information to be generated.

4. The control device according to claim 1, wherein the request includes information for identifying the sensing target.

5. The control device according to claim 1, wherein the control unit transmits the information regarding the sensing target to the another control device after the control unit specifies that the sensing target has moved to the sensable range of the second sensor device.

6. The control device according to claim 1, wherein, in a case where the control unit recognizes movement of the sensing target on a basis of the sensing information of the first sensor device, the control unit transmits a request for searching for the second sensor device to the another control device.

7. The control device according to claim 1, wherein, in a case where the control unit recognizes movement of the sensing target on a basis of sensing information of the second sensor device, the control unit receives a request for searching for the first sensor device from the another control device.

8. The control device according to claim 1, wherein the control unit transmits information regarding the terminal device to the another control device in a case where the terminal device moves from the first cell to the second cell.

9. The control device according to claim 1, wherein the control unit transmits information regarding the another control device to the terminal device in a case where the terminal device moves from the first cell to the second cell.

10. The control device according to claim 1, wherein the control unit receives position information of the terminal device from the terminal device and transmits sensing information to the terminal device.

11. The control device according to claim 1, wherein the control unit receives position information or sensing information of the sensor device from the sensor device.

12. The control device according to claim 1, wherein the control unit transmits or receives position information of the terminal device, or position information or sensing information of the sensor device to or from the another control device.

13. The control device according to claim 1, wherein the terminal device is a device of a runner, and the sensing target is another runner preceding the runner.

14. The control device according to claim 1, wherein the terminal device is a device of a guardian or a caregiver, and the sensing target is a person to be watched of the guardian or the caregiver.

15. The control device according to claim 1, wherein the terminal device is a device of a store or a police, and the sensing target is a customer who has left the store.

16. A method executed by a control device arranged on a local network side with respect to a gateway between an internet and a local network, the method comprising:
transmitting or receiving information regarding one or more sensor devices wirelessly connected to a first cell associated with the control device to or from another control device associated with a second cell;
selecting a first sensor device capable of sensing a sensing target on a basis of a request from a terminal device;
generating service information on a basis of sensing information of the selected first sensor device; and
providing the service information to the terminal device,
wherein, in a case where the sensing target moves from a sensable range of the first sensor device to a sensable range of a second sensor device, the information regarding the sensing target is transmitted to the second sensor device, and wherein the information regarding the sensing target is transmitted to the another control device in a case where the second sensor device is connected to the second cell.

* * * * *